United States Patent
Luo et al.

(10) Patent No.: US 11,620,019 B1
(45) Date of Patent: Apr. 4, 2023

(54) ADAPTIVE PREDICTIONS OF CONTACT POINTS ON A SCREEN

(71) Applicant: Amazon Technologies, Inc., Seattle, WA (US)

(72) Inventors: Junwu Luo, Milpitas, CA (US); Kevin Joonho Moon, Schwenksville, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/509,577

(22) Filed: Oct. 25, 2021

(51) Int. Cl.
  *G06F 3/041* (2006.01)
  *G06F 3/038* (2013.01)
  *G06F 3/0354* (2013.01)

(52) U.S. Cl.
  CPC .......... *G06F 3/0418* (2013.01); *G06F 3/0383* (2013.01); *G06F 3/03545* (2013.01)

(58) Field of Classification Search
  CPC ........................... G06F 3/0383; G06F 3/03545
  See application file for complete search history.

(56) References Cited

U.S. PATENT DOCUMENTS

| | | | | |
|---|---|---|---|---|
| 5,995,081 A | * | 11/1999 | Kato | G06T 11/203 345/174 |
| 8,487,896 B1 | * | 7/2013 | Brown | G06F 3/0418 345/173 |
| 2012/0105357 A1 | * | 5/2012 | Li | G06F 1/3262 345/174 |
| 2016/0188112 A1 | * | 6/2016 | Forlines | G06N 5/04 345/173 |
| 2019/0296757 A1 | * | 9/2019 | Kuwahara | H03M 13/03 |

* cited by examiner

*Primary Examiner* — Chun-Nan Lin
(74) *Attorney, Agent, or Firm* — Kilpatrick Townsend & Stockton LLP

(57) ABSTRACT

Techniques for adaptive predictions of points on a screen are described. In an example, a device predicts a first point to be detected on a screen at a first time. At the first time, the device detects a second point on the screen. The device also predicts a set of points based at least in part on the second point. The set of points includes a third point to be detected on the screen at a second time. Based least in part on the first point and the second point, the device determines a first prediction error. The device also selects the third point from the set of points based at last in part on the first prediction error. Prior to the second time, an output is displayed on the screen at the third point.

20 Claims, 14 Drawing Sheets

ADAPTIVE PREDICTIONS OF CONTACT POINTS ON A SCREEN

BACKGROUND

Computing devices can include multiple types of input interfaces and output interfaces. A screen is an example of an output interface. A touchscreen is an example of an input and output interface. A stylus can also be used with a touchscreen at least to provide input at the touchscreen. For instance, the stylus can be used to write, draw, or perform another operation on the touchscreen. The touchscreen is updated to display the corresponding output.

BRIEF DESCRIPTION OF THE DRAWINGS

Various embodiments in accordance with the present disclosure will be described with reference to the drawings, in which.

DETAILED DESCRIPTION

Figure 1:
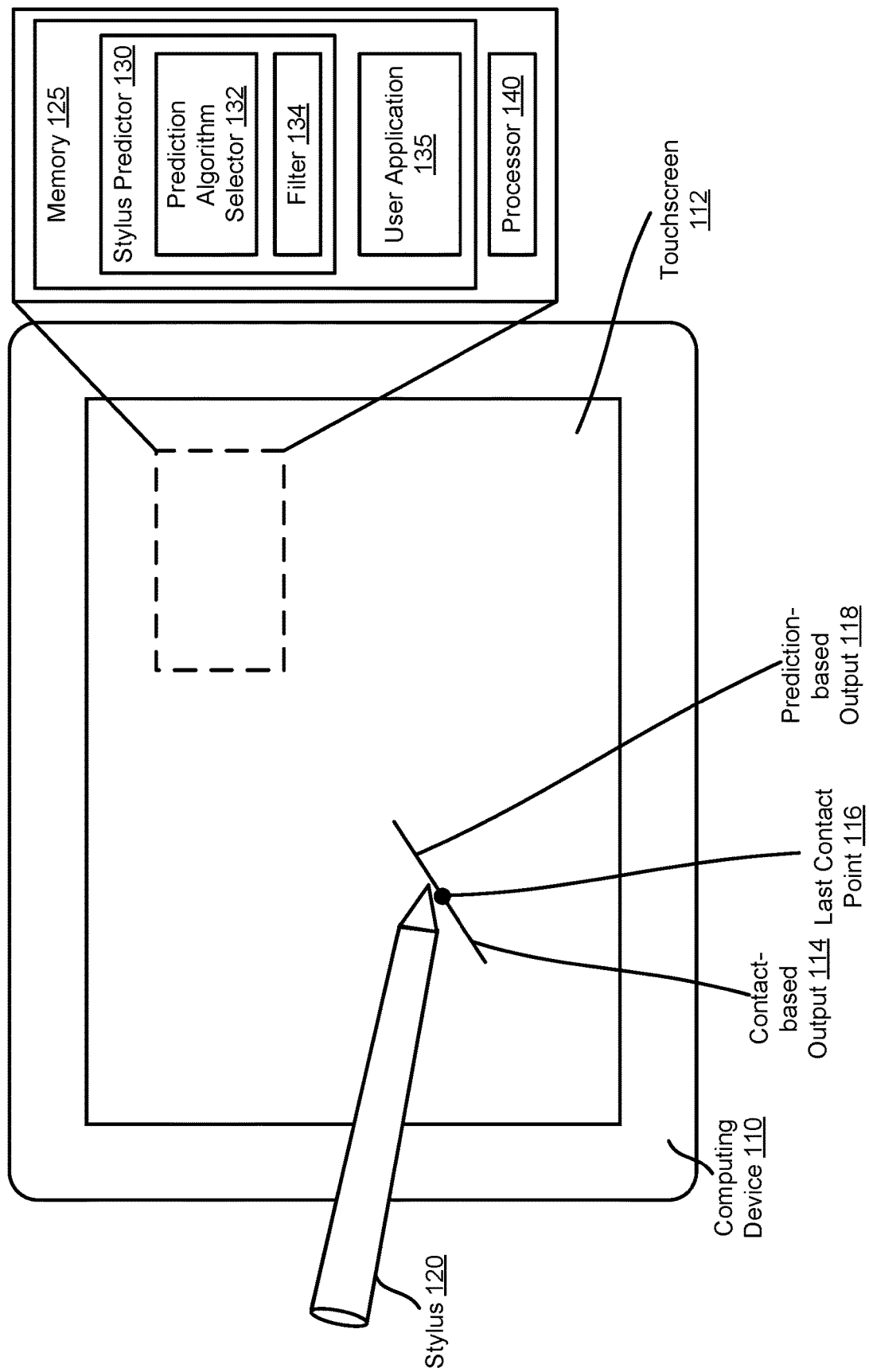
FIG. 1 illustrates an example of a computing device configured for adaptive predictions of contact points on a screen of the computing device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to, among other things, for adaptive predictions of points on a screen of a computing device. In an example, a predicted point on the screen is used to display an output at the predicted point prior to receiving a corresponding input. In this way, the latency between receiving the input and the screen display can be reduced. Because the predicted point is used for displaying the output prior to the computing device detecting the actual input point, the accuracy of the prediction can impact the quality of the display of the output and the related user experience. To improve the accuracy and, hence, the display quality and user experience, the embodiments can involve a prediction algorithm selection technique and/or a filtering of prediction points technique.

In an example, the prediction algorithm selection technique includes executing multiple prediction algorithms in parallel. Each prediction algorithm can output a set of predicted points based on a set of previously detected points on the screen. A prediction error can be determined for each prediction algorithm based on the previously detected points and based on the prediction points that are output by the prediction algorithm and that correspond to the previously detected points. The prediction algorithm having the smallest prediction error can be selected as the source of prediction points. The output of the selected prediction algorithm can be used for the displaying on the screen. This selection process can be repeated over time upon the detection of additional input points on the screen.

In an example, the filtering of prediction points technique includes changing a filter setting based on the prediction error of the selected prediction algorithm. Depending on the filter setting, certain predicted points that are output by the selected prediction algorithm are removed such that they are no longer usable in the proactive displaying on the screen. For instance, the larger the prediction error is, the more restrictive the filtering becomes, thereby removing a relatively larger number of predicted points from the prediction algorithm's output. Conversely, the smaller the prediction error is, the less restrictive the filtering becomes.

To illustrate, consider an example of a tablet that has a touchscreen and a stylus. A processor of the tablet executes a drawing application, whereby the stylus is usable to trace lines on the touchscreen, and the drawing application presents these lines. A touch controller outputs data about detected contact points of the stylus on the touchscreen at a 250 Hz reporting rate. The data indicates, for each contact point, a position on the touchscreen such as its (x,y) coordinates in a coordinate system of the touchscreen (although, as further described in the figures, the data may not be limited to coordinates). As such, every 4 milliseconds, (x,y) coordinates of a contact point are detected and buffered. Typically, a processing latency exists between the time the contact point is detected and the output of the drawing application to present a portion of the line at that contact point.

To enhance the user experience, the process can execute multiple prediction algorithms in parallel, such as a curve fitting algorithm, a long short-term memory (LSTM) neural network algorithm, and a linear algorithm in order to reduce the user-perceived latency. Based on a set of previously detected contact points, a next set of predicted contact points are determined by the prediction algorithms and output to the drawing application to then control the output on the touchscreen. This output is presented before the corresponding contact points are actually detected. Once these contact points are detected, the output can be adjusted. The adjustment to the lines may be acceptable from a user experience perspective if the error between a predicted contact point and the corresponding detected contact point is small enough (e.g., smaller than a prediction error threshold). The adjustment may also be acceptable because the error exists for a short time (e.g., with a 60 Hz display, prediction points exist for 16 milliseconds before being replaced with the corresponding detected points).

Continuing with the above illustration, each prediction algorithm predicts seven contact points over a 30 millisecond time window. In particular, the output of each prediction algorithm includes predicted (x,y) coordinates of the seven points, among other predicted data and is stored in a first input first output (FIFO) buffer that corresponds to the prediction algorithm. Subsequently, the actual contact points are detected and measured data about these contact points (e.g., including measured (x,y) coordinates) is stored in a FIFO buffer that corresponds to the touch controller. As such, it becomes possible to compute the prediction error per prediction algorithm by comparing the predicted data that was output by the prediction algorithm to the measured data that was output by the touch controller. In particular, the prediction error can be a distance and angle function computed by using the predicted (x,y) coordinates and the measured (x,y) coordinates. The prediction algorithm having the smallest prediction error is used as the source of prediction points for the next 30 millisecond time window.

Assuming that the curve fitting algorithm has the smallest prediction error, this algorithm uses the measured data (e.g., corresponding to the last 30 milliseconds or some other past time window) to output the next seven predicted points over the next 30 millisecond time window). These seven points can be filtered based on a filter setting. The filter setting can be, for instance, a distance threshold and/or an angle threshold. After the filtering, the remaining predicted points are provided to the drawing application. The filtering can be used to reduce the error associated with adjusting the line when the actual contact points in the next 30 millisecond window are detected. This error is referred to herein as an adjustment error. Based on the prediction error of the selected prediction algorithm, the filter setting can be adjusted. Generally, the larger the prediction error, the more restrictive the filter setting becomes in order to reduce the adjustment error. If a predicted point is at an angle smaller than the angle threshold and/or at a distance greater than the distance threshold relative to the most current detected contact point, that predicted contact point is removed and any subsequent predicted point is also automatically removed. Data about the predicted contact points that are not filtered out becomes input to the drawing application that then presents the line at these predicted contact points before the corresponding contact points are actually detected.

FIG. 1 illustrates an example of a computing device 110 configured for adaptive predictions of contact points on a screen of the computing device 110, according to embodiments of the present disclosure. In the illustration of FIG. 1, the screen is a touchscreen 112 configured as an input and output interface. A stylus 120 can be used as an input device, where contact between the stylus 120 and the touchscreen 112 can cause an operation of the computing device 110, and where the touchscreen 112 can present an output of the operation. A memory 125 of the computing device 110 stores program codes that can be executed by a processor 140 of the computing device. The program codes correspond to a stylus predictor 130 and a user application 135. Upon execution, the stylus predictor 130 can generate data about predicted contact points of the stylus 120 on the touchscreen 112. This data can be input to the user application 135. In response, the user application 135 can perform the operation and present the relevant output on the touchscreen 112.

In an example, the computing device 110 includes any type of device suitable for operations by a user and that includes one or more memories, one or more processors, and one or more input/output (I/O) interfaces. For instance, the computing device 110 can be a tablet, a smart phone, a laptop, a desktop computer, a kiosk computer, an internet of things (IoT) device, or any other suitable device.

The user application 135 can be any type of application suitable for controlling a functionality of the computing device 110. The functionality can be an input function, an output functionality, or an I/O functionality. For instance, the user application 135 can be a text application that allows free form text input on the touchscreen 112 (e.g., a notepad application), where the corresponding text can be presented on the touchscreen 112. The user application 135 can also or alternatively be a drawing application that allows free form drawing input on the touchscreen 112 (e.g., a paint application, a sketch application, etc.), where the corresponding drawing can be presented on the touchscreen 112.

The stylus 120 can be any type of suitable input device having a tip that can contact the touchscreen 112 and be used to control the input. For instance, the stylus 120 can be a pen-shaped instrument having a tip detectable by a touch controller. This pen can be used to write, draw, or make selections on the touchscreen 112.

In an example, the stylus predictor 130 can receive input data indicating detected contact points of the stylus 120 on the touchscreen 112. Based on the input data, the stylus predictor 130 generates output data indicating predicted contact points of the stylus 120 on the touchscreen 112. The output data is provided to the user application 135 that then presents an output at the touchscreen 120.

A contact point can be a point on the touchscreen 112. This point can be a set of pixels (e.g., not limited to a single pixel) where contact is detected or predicted, as the case may be. Contact can be detected based on capacitive sensing, resistive sensing, or any other type of sensing that the touchscreen 112 supports. The number of pixels can depend on the amount of contact (detected or predicted) between the stylus 120 and the touchscreen 112, the pressure of this contact, and/or the change to the sensing. The data about a contact point can include, among other things, the coordinates of the corresponding pixels in a coordinate system of the touchscreen 112 (e.g., one with an origin at a particular position on the touchscreen 112).

As illustrated in FIG. 1, the stylus predictor 130 can include a prediction algorithm selector 132 and a filter 134. The prediction algorithm selector 132 selects a prediction algorithm from multiple prediction algorithms that are executed in parallel (e.g., by the processor 140). The filter 134 can remove certain predicted contact points from the output of the selected prediction algorithm, such that data about the remaining predicted contact points are provided to the user application 135.

A prediction algorithm receives data indicating detected contact points of the stylus 120 on the touchscreen 112 (e.g., coordinates of these contact points) over a last period of time (e.g., the last 30 milliseconds). In response, the prediction algorithm outputs data indicating predicted contact points of the stylus 120 on the touchscreen 112 (e.g., also coordinates of these contact points) over a next period of time (e.g., the next 30 milliseconds). The past and next periods of time need not but may have a same time length (e.g., 30 milliseconds).

The prediction algorithm selector 132 computes, per prediction algorithm, a prediction error over the past period of time. For each prediction algorithm, the prediction error can be computed using the data indicating the detected contact points and the data indicating the corresponding predicted contact points that were predicted by the prediction algorithm. Examples of how the prediction error can be computed based on distances and angles are further described in the next figures. Once the prediction errors of the prediction algorithms are computed, the prediction algorithm selector 132 selects the prediction algorithm with the smallest prediction error. The output data of the selected prediction algorithm for the next period of time is further processed by the filter 134 before being output to the user application 135.

The filter 134 can be adaptively adjusted based on the prediction error of the selected algorithm. For example, the filter 134 includes one or more filter settings usable to remove predicted contact points. These filter settings can include, among other things, distance threshold(s) and angle threshold(s) as further described in the next figures. Generally, the larger the prediction error is, the lower the accuracy of a predicted contact point becomes (e.g., the difference between this predicted contact point and the actual contact point when detected). Accordingly, the larger the prediction error is, the more restrictive the filter settings can be made. Given the prediction error computed for the selected prediction algorithm using the data about the last period of time, the filter settings are adjusted for the next period of time and the filter 134 removes some of the predicted contact points to then provide output data about the remaining predicted contact points (e.g., their coordinates) to the user application 135.

In turn, the user application 135 presents an output on the touchscreen 112. The output can be presented at the predicted contact points (e.g., the ones that were not filtered out) proactively before the corresponding contact points are actually detected. Once these contact points are detected, the user application 135 can adjust the output such that it is presented at the actual detected contact points.

In the illustration of FIG. 1, the stylus 120 is used to draw a line (illustrated as a diagonal line with the stylus 120 moving from left to right). The last contact point 116 of the stylus 120 on the touchscreen 112 is detected (shown with a solid circle in the figure). This contact point 116 may lag by a short amount of time from the actual current contact point of the stylus 120 on the touchscreen 112 because of sensing and processing latencies. Contact points that were detected prior to the detection of the last contact point 116 are used to draw the portion of the line to the left of the last contact point 116. This portion is shown in the figure as a contact-based output 114. Data about these detected contact points, including the last contact point 116, are input to the stylus predictor 130 that then outputs data about predicted contact points to the user application 135. The user application 135 then draws the portion of the line to the right of the last contact point 116. This portion is shown in the figure as a prediction-based output 116 and corresponds to the positions of the predicted contact points. The use of predicted contact points for displaying an output on the touchscreen 112 (e.g., a portion of the line) prior to detecting the actual contact points allows the reduction of the moving latency. The moving latency is a user-perceived latency between the user moving the tip of the stylus 120 on the touchscreen 112 and the touchscreen 112 displaying a corresponding output.

Although FIG. 1 describes contacts between the stylus 120 and the touchscreen 112, the embodiments of the present disclosure are not limited as such. A contact is an example of a type of interaction between a stylus and a screen. Other types of interactions are possible and can include contactless interactions. An interaction represents an action that can be initiated using the stylus and that can be detected as input to a computing device, where this input may cause an output to be displayed on the screen of the computing device. The type of action and/or detection can depend on the underlying hardware and/or software technology of the stylus, the computing device, and the screen, where this technology can support contact-based, optical-based, magnetic-based, and/or wireless communication-based interactions. For example, the embodiments similarly apply to a contactless input, where a point on the touchscreen can be detected without necessarily a contact being received at that point. For instance, the computing device 110 and/or the stylus 120 can support contactless-based sensing, where a point on the touchscreen 112 can be detected when the stylus is at some predefined distance (e.g., 5 millimeters) away from the touchscreen. Additionally, although FIG. 1 describes the use of the stylus 120, the embodiments of the present disclosure are not limited as such. Instead, the embodiments similarly apply to any other type of input objects which can be, for instance, a user finger or multiple user fingers.

Furthermore, the embodiments are not limited to a touchscreen. For instance, the embodiments similarly apply to any type of screen, where an input device can be coupled therewith to detect points (contact-based or contactless-based) that are then processed for predicting the next expected points. To illustrate, gaze techniques can be implemented. A computing device can be equipped with optical sensors and processors that track a position of a gaze of a user on a screen. The position corresponds to a detected point. In another illustration, a mouse input device or a touchpad can be coupled with the computing device to receive input indicating a position on the screen. Here also, the position corresponds to a detected point.

Figure 2:
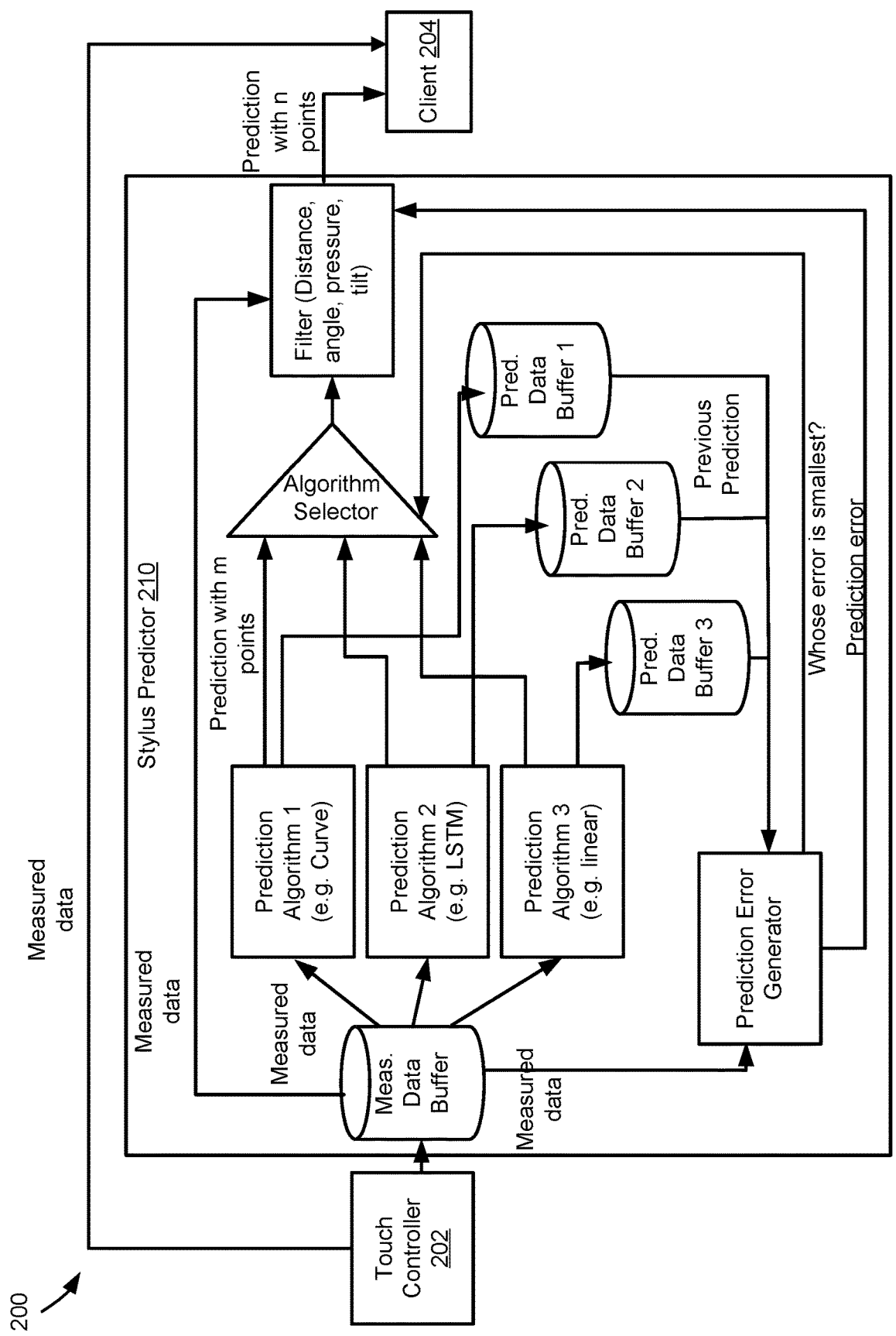
FIG. 2 illustrates an example of components of a computing device configured for adaptive predictions of contact points on a screen of the computing device, according to embodiments of the present disclosure.

FIG. 2 illustrates an example of components of a computing device 200 configured for adaptive predictions of contact points on a screen of the computing device, according to embodiments of the present disclosure. The computing device 200 is an example of the computing device 110 of FIG. 1. As illustrated, the computing device 200 includes a touch controller 202 (e.g., a hardware component implemented as an integrated circuit (IC) that can be a component of a touchscreen or a component of a separate circuit that interfaces with the touchscreen), a stylus predictor 210 (e.g., implemented as a set of program codes stored in a memory of the computing device 200 and executable by a processor of the computing device 200), and a client 204 (e.g., a hardware component storing and/or executing a set of user applications; this hardware component can be the same or different from the memory and the processor).

The touch controller 202 can detect positional contact pressure on a visual display surface, such as a touchscreen of the computing device 200. The touch controller 220 generates and outputs measured data about the detected contact points. The measured data includes, among other thigs, coordinates of the detected contact points. Additionally, when a stylus is used, the measured data can include pressure data indicating a pressure of the stylus on the touchscreen at each contact point as well as tilt data indicating a tilt of the stylus relative to the touchscreen at the contact point.

In an example, the touch controller 202 generates the measured data at a particular rate, such as 250 Hz (or, equivalently, data about a contact point at every 4 milliseconds). The measured data is stored as time-series data in a measured data buffer. The time-series data is a series of data points indexed in a time order. In particular, each contact point has a time index, and the different contact points are sequenced in an ascending order of their time indexes (e.g., a first contact point having a time index "0" corresponding to time at 0 milliseconds, a second contact point having a time index "1" corresponding to time at +4 milliseconds, a third contact point having a time index "2" corresponding to time at +8 milliseconds, and so on).

The measured data is used in multiple ways. First, measured data corresponding to a last period of time (e.g., the last 28 milliseconds) is used for generating predicted contact points for a next period of time, and these predicted contact points are provided to the client 204 in support of a prediction-based output. This measured data is also used to compute various filtering measures, such as distances and angles. Second, measured data about the next period of time, when it becomes available, is also provided to the client 204 in order to adjust the prediction-based output on the touchscreen. Third, when the next time period becomes the last time period, the measured data is input to a prediction error generator for the computation of a prediction error per prediction algorithm.

As far as the predicted contact points, measured data about the last period of time is input to multiple prediction algorithms, such as but not limited to a curve fitting algorithm, an LSTM neural network algorithm, and a linear algorithm. These predictions algorithms are executed in parallel and each can output a prediction of "m" contact points based on the input data. The prediction rate may, but need not, be the same as the reporting rate of the touch controller 202. For instance, the touch controller 202 reports measured data about a detected contact point every 4 milliseconds (or 250 Hz). In this example, "m" contact points are predicted per prediction algorithm every 4 milliseconds (or 250 Hz). The number "m" of contact points can also, but need not be, the same as the number of the detected contact points of the last period of time. Generally, the number "m" can be a function of a target prediction time window in order to reduce a user-perceived latency. For instance, a total moving latency without the use of predicted points is 70 milliseconds. An acceptable user-perceived latency is 40 milliseconds. Accordingly, the time window be 30 milliseconds long, resulting in seven predicted contact points at a prediction rate of 250 Hz.

In a particular illustration of this example, a rolling window of 28 milliseconds (smaller than the acceptable user-perceived latency of 30 milliseconds) is used and is shifted by 4 milliseconds. At time "t=+28 milliseconds," the last seven detected contact points are processed (corresponding to "t=0, +4, +8, +12, +16, +20, and +24 milliseconds") to generate a prediction for the next seven contact points (e.g., corresponding to "t=+28, +32, +36, +40, +44, +48, +52 milliseconds") per prediction algorithm. 4 milliseconds thereafter, the rolling window is shifted by 4 milliseconds. With this shift, at time "t=+32 milliseconds," the last seven detected contact points are processed (corresponding to "t=+4, +8, +12, +16, +20, +24, and +28 milliseconds") to generate a prediction for the next seven contact points (e.g., corresponding to "t=+32, +36, +40, +44, +48, +52, and +56 milliseconds") per prediction algorithm.

In another illustration of this example, a non-rolling window of 28 milliseconds (smaller than the acceptable user-perceived latency of 30 milliseconds) is used and is shifted by its time length of 28 milliseconds. At time "t=+28 milliseconds," the last seven detected contact points are processed (corresponding to "t=0, +4, +8, +12, +16, +20, and +24 milliseconds") to generate a prediction for the next seven contact points (e.g., corresponding to "t=+28, +32, +36, +40, +44, +48, +52 milliseconds") per prediction algorithm. 28 milliseconds thereafter, the non-rolling window is shifted by 28 milliseconds. With this shift, at time "t=+56 milliseconds," the last seven detected contact points are processed (corresponding to "t=+32, +36, +40, +44, +48, +52, and +56 milliseconds" to generate a prediction for the next seven contact points (e.g., corresponding to "t=+60, +64, +68, +72, +76, +80, and +84 milliseconds") per prediction algorithm.

Data of each prediction algorithm about the "m" contact points is stored as predicted data in a buffer associated with the prediction algorithm (shown in FIG. 2 as predicted data buffer "i", where "i=1" corresponds to the curve fitting algorithm, "i=2" corresponds to the LSTM neural network algorithm, and "i=3" corresponds to the linear algorithm). The predicted data can be time-series data using the same time indices as the measured data. In an example, the predicted data of a prediction algorithm includes, among other things, coordinates of the "m" predicted contact points. Additionally, when a stylus is used, the predicted data can, but need not include, a predicted pressure of the stylus on the touchscreen at each predicted contact point and/or a predicted tilt of the stylus relative to the touchscreen at the predicted contact point. In some examples and depending on the user application, the predicted pressure can be used to control the width of the displayed output (e.g., the thickness of the line that is being drawn), whereas the tilt can control the brightness or shade of the displayed output (e.g., how faded the line is). Some of the prediction algorithms (e.g., the linear prediction algorithm) may not be configured to output a predicted pressure and/or a predicted tilt, whereas another prediction algorithm (e.g., the LSTM neural network algorithm) may be configured to do so. In this case, the predicted data of the former prediction algorithm (e.g., the linear prediction algorithm) may be supplemented with the pressure and/or tilt predictions of the latter prediction algorithm (e.g., the LSTM neural network algorithm). In this way, if a prediction error is to be computed based on pressure and/or tilt and/or if filtering is to be applied based on the pressure and/or tilt, the predicted data of the former prediction algorithm may include the needed pressured and/or tilt data (although that this data is actually predicted by the latter prediction algorithm).

Referring to the prediction error generator, this component can be operated at the same rate as the prediction rate and use the same length of a time period. For instance, the prediction error generator outputs a prediction error for each prediction algorithm every 4 milliseconds by processing 28 millisecond windows (rolling or non-rolling depending on how the predictions are implemented). To do so, the prediction error generator receives the measured data that has been buffered and, per prediction algorithm, the predicted data that also has been buffered, where the measured data and the predicted data span the same period of time. Referring to the current time of "t=+56 milliseconds," measured data and predicted data, per prediction algorithm, have been buffered for the last 28 millisecond window and correspond to last seven contact points at "t=+32, +36, +40, +44, +48, +52, and +56 milliseconds. Per prediction algorithm, the prediction error generator generates an individual prediction error, each corresponding to a pair of detected contact point and predicted contact point that have the same time index (e.g., per prediction algorithm, seven individual prediction errors are generated, a first prediction error for "t=+32 milliseconds," a second prediction error for "t=+36 milliseconds," and so on until the seventh prediction error for "t=+56 milliseconds). A statistical measure is applied to the individual prediction errors of a prediction algorithm over the last period of time to generate a collective prediction error of the prediction algorithm over that period of time. In an example, the statistical measure can be a selection of the largest prediction error among the seven computed individual prediction errors. In another example, the statistical measure can be a smoothing, such as an averaging or a weighted average (with the weight decreasing with an increase of the time index), of the seven computed individual prediction errors. The prediction error generator then compares the collective prediction errors of the different prediction algorithms to select one of these algorithms. For example, the prediction algorithm having the smallest prediction error is selected (e.g., the curve fitting algorithm). This selection is indicated to an algorithm selector that then uses the output of the selected prediction algorithm, where this output includes the predicted data about the "m" contact points over the next period of time (e.g., the next 28 millisecond window that includes the next seven predicted contact points, starting at "t=+60 milliseconds" and ending at "t=+84 milliseconds).

The algorithm selector passes the predicted data about the "m" contact points of the selected prediction algorithm (e.g., the curved fitting algorithm) over the next time period to a filter. The filter can include multiple filter settings, such as distance thresholds, angle thresholds, pressure thresholds, and/or tilt thresholds). Each threshold can be a value used for a comparison with a value indicated in the predicted data for a predicted contact point. Depending on the result of the comparison, the predicted contact point can be removed or retained in the final set of predicted data points to be output to the client 204 for use by the user application. In an example, the filter settings can be adjusted depending on the prediction error that was generated by the prediction error generator and that resulted in the selection of the prediction algorithm. In particular, this prediction error can be used as a confidence level feedback to the filter. The larger the prediction error is, the lower the confidence level becomes and, accordingly, the more restrictive the filter settings can become by properly adjusting the values of the thresholds. Adjustment logic can be stored, where ranges of the prediction errors can be mapped to range values of the thresholds. Once the predicted contact points are filtered, the filter outputs predicted data about the remaining "n" contact points, where "n" is equal to or smaller than "m" depending on the filtering.

Figure 3:
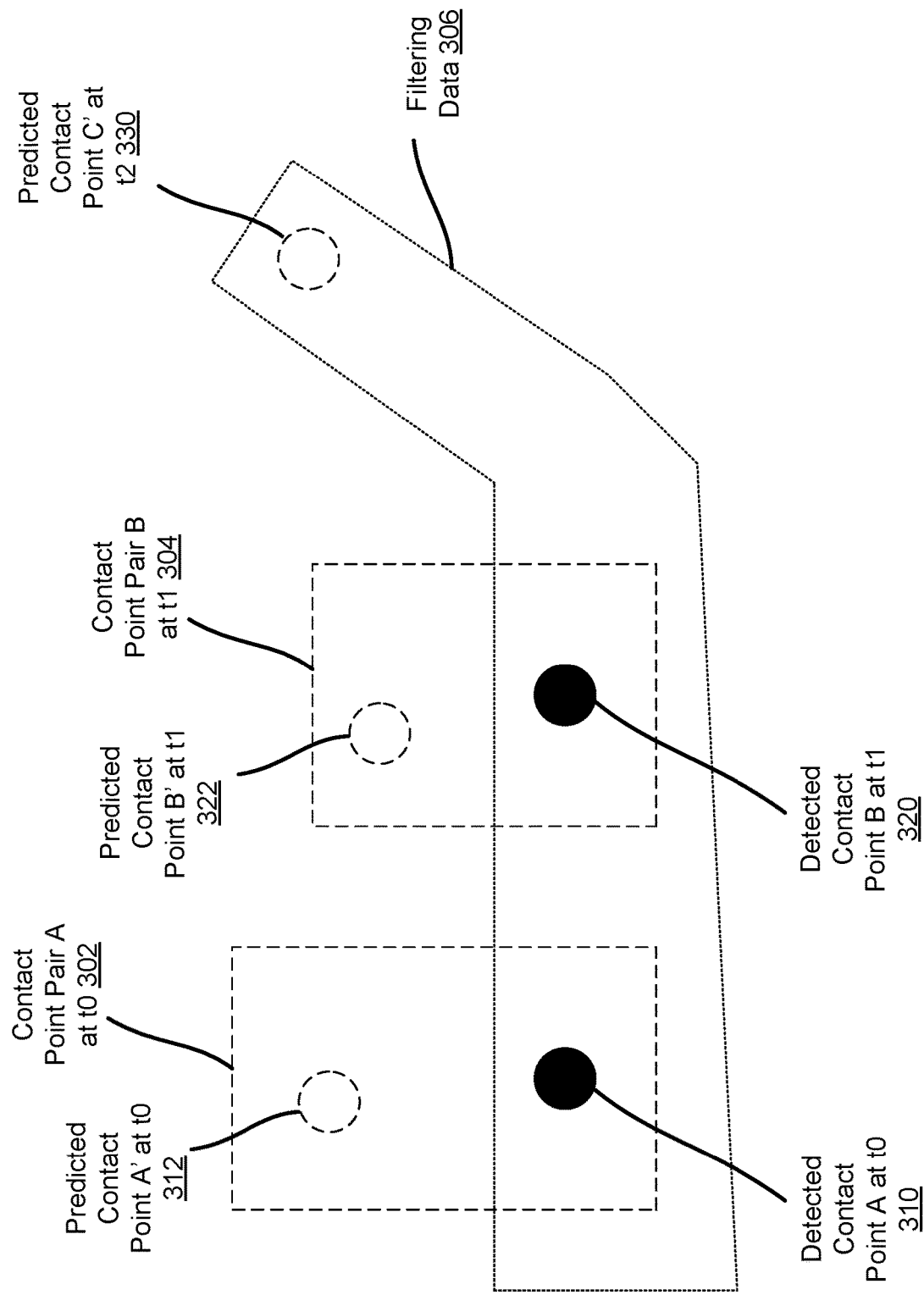
FIG. 3 illustrates an example of detected contact points and predicted contact points usable to determine prediction errors and filtering data, according to embodiments of the present disclosure.

FIG. 3 illustrates an example of detected contact points and predicted contact points usable to determine prediction errors and filtering data, according to embodiments of the present disclosure. Generally, the error prediction computation involves a set of detected contact points and a set of predicted contact points that correspond to the detected contact points. These sets are illustrated with dashed lines in the figure. In comparison, the filtering involves a set of detected contact points and a set of predicted contact points for which no contact points have been detected yet. These sets are illustrated with dotted lines in the figure.

In the illustration of FIG. 3, two detected points are shown: a first detected contact point A 310 having a time index t0 and a second detected contact point B 320 having a time index t1. Two predicted contact points that correspond to these two detected points are also shown: a first predicted contact point A' 312 having the time index t0 and corresponding to the first detected contact point A 310, and a second predicted contact point B' 322 having the time index t1 and corresponding to the second detected contact point B 320. A detected point and a predicted contact point that have the same time index form a pair of contact points having that time index. As such, a first contact point pair A 302 having the time index t0 is formed by the first detected contact point A 310 and the first predicted contact point A' 312. Likewise, a second contact point pair B 304 having the time index t1 is formed by the second detected contact point B 320 and the second predicted contact point B' 322.

Of course, more than two detected contact points, more than two predicted contact points, and more than two pairs are possible. Further, the two illustrated contact points are assumed to be predicted by a same prediction algorithm. When multiple prediction algorithms are used, additional predicted contact points are possible, where each predicted contact point of a prediction algorithm can correspond to a detected contact point, and where each detected contact point can correspond to multiple predicted contact points of the different prediction algorithms.

The first contact point pair A 302 is used to compute a first individual prediction error of the prediction algorithm at time index t0. Likewise, the second contact point pair B 304 is used to compute a second individual prediction error of the prediction algorithm at time index t1. When these two time indexes t0 and t1 fall in the same processing time period, a collective prediction error of the prediction algorithm for that period of time can be generated based on the two individual prediction errors (e.g., by applying a statistical measure to these two individual prediction errors). A prediction error can be a function of distance, angle, pressure, and/or tilt as further described in the next figures.

In also the illustration of FIG. 3, a third predicted contact point C' 330 having time index t2 is shown. This time index t2 falls in a period of time during which no contact point has been detected yet (e.g., whereas t0 and t1 fall in the last period of time, t2 falls in the next period of time). As such, the third predicted contact point C' 330 does not currently have a correspondence to a detected contact point. Predicted data about the predicted contact point C' (including, for instance, coordinate or position data, pressure data, and/or tilt data) and measured data about the detected contact points having time indexes in the last period of time (e.g., including, for instance, coordinate or position data, pressure data, and/or tilt data of the first detected contact point 310 and the second detected contact point 320) form filtering data 306. The filtering data 306 is used to determine whether the third predicted contact point C' should be removed or retained. As further illustrated in the next figures, the filtering can involve comparisons of the filtering data 306 with filter settings, such as by comparing derived distances, angles, pressures, and/or tilts to distance thresholds, angle thresholds, pressure thresholds, and/or tilt thresholds.

Figure 4:
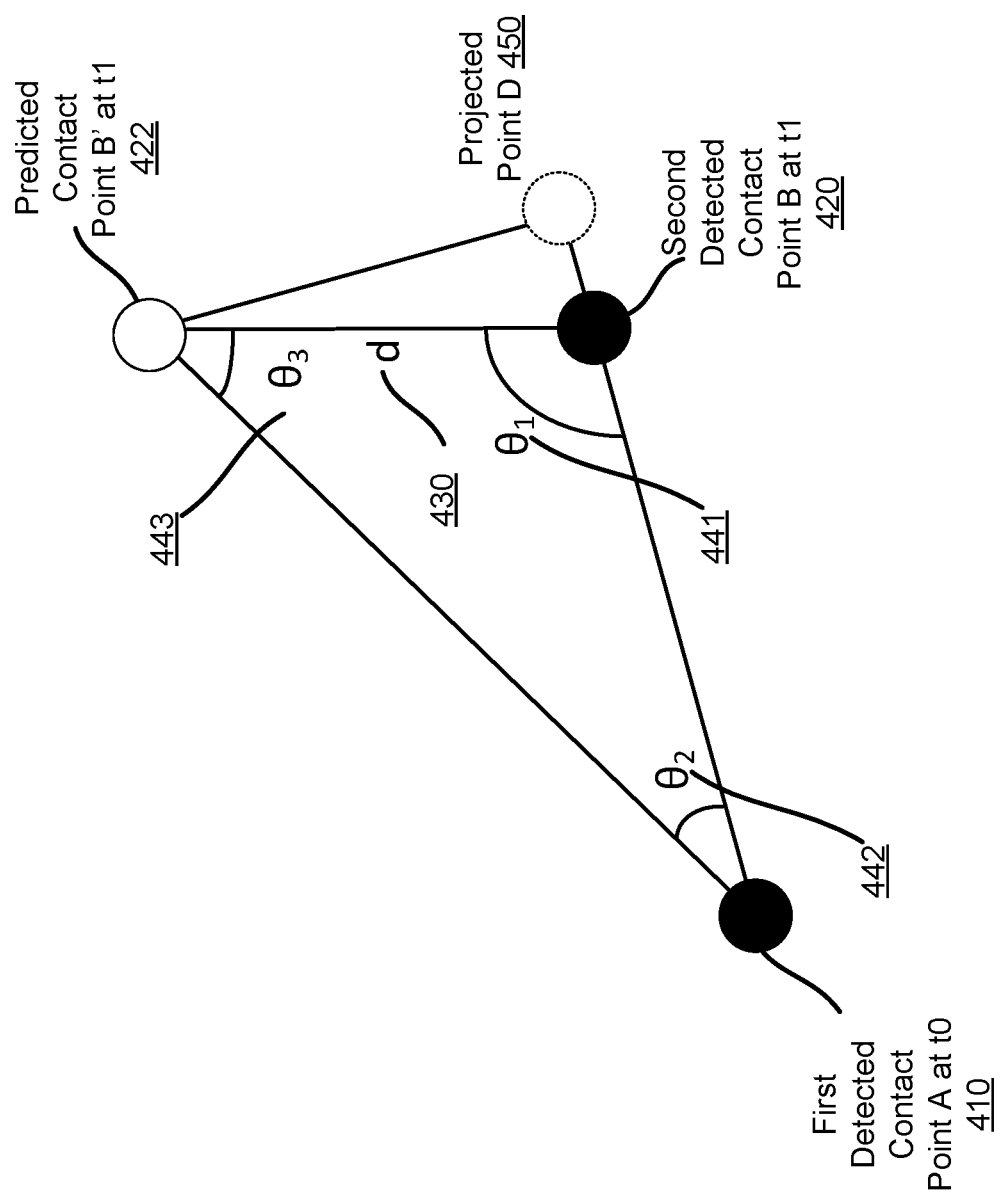
FIG. 4 illustrates an example of computing a prediction error, according to embodiments of the present disclosure.

FIG. 4 illustrates an example of computing a prediction error, according to embodiments of the present disclosure. In the interest of clarity of explanation, the example is described in connection with three contact points, although a larger number of contact points is possible and can be used to compute one or more individual prediction errors. In the example of FIG. 4, two detected points are shown: a first detected contact point A 410 having a time index t0 and a second detected contact point B 420 having a time index t1. A predicted contact point B' 422 having the time index t1 is also shown and corresponds to the second detected contact point B 420. Different types of prediction error computation are possible based on the data about these contact points including position data (e.g., the coordinates of these contact points), pressure data (e.g., measured or predicted pressure, as may be the case, of a stylus on a touchscreen at each contact point), and/or tilt data (e.g., measured or predicted title, as may be the case, of the stylus relative to touchscreen at each contact point). Some or all of these prediction errors (e.g., distance prediction errors, angle prediction error, pressure prediction error, and/or tilt prediction error) can be combined (e.g., as a sum of scalar values, as a weighted sum of these scalar values, or as a vector of the scalar values).

To compute a distance prediction error at time index t1, the pair of detected contact point and predicted contact point having the time index t1 is determined and the distance between these two points is computed based on their position data (shown as a distance d 430 between the second detected contact point B 420 and the predicted contact point B' 422). The distance d 430 can be the Euclidean distance determined from the coordinates of the second detected contact point B 420 and the coordinates of the predicted contact point B' 422. Generally, the larger the distance d 430 is, the greater the distance prediction error is.

To compute an angle prediction error at time index $t_i$, three contact points are used to define an angle. Two of the contact points include the pair of detected contact point and predicted contact point having the time index $t_i$. The third contact point includes the detected contact point having a time index immediately prior to $t_i$ (e.g., $t_{i-1}$). In the case of t1, the three contact points are the second detected contact point B 420, the predicted contact point B' 422, and the first detected contact point A 410. The angle is formed by these contact points and can be any of $\theta_1$ 441 corresponding to ABB', $\theta_2$ 442 corresponding to BAB', or $\theta_3$ 443 corresponding to BB'A. Generally, the larger the angle $\theta_1$ 441 is to the smaller the angle $\theta_2$ 442 is, the smaller the angle prediction error is. That is because a small acute angle $\theta_2$ 442 or a large obtuse angle $\theta_1$ 441 indicates a less likely sudden shift in the directionality of the touchscreen input.

In an example, the distance d 430 and the angle $\theta_i$ (where "i=1, 2, or 3)" are combined to generate a scalar value indicating a prediction error at time t1. The combination can involve an algebraic equation based on the angles and the sides of the ABB' triangle defined by the three contact points 410, 420, and 422. For instance, the prediction error is expressed as $w_1 \times B'D + w_2 \times BD$, where "$w_i$" is a predefined weight, and where "D" is a projected point 450 to form a right triangle with the pair of contact points at t1 (e.g., the second detected contact point B 420, the predicted contact point B' 422, and the projected point D 450 form a right triangle with BB' defining the hypotenuse).

To compute a pressure prediction error at time index t1, the pair of detected contact point and predicted contact point having the time index t1 is determined (e.g., the second detected contact point B 420 and the predicted contact point B' 422). Next, the measured pressure value and the predicted pressure value corresponding to this pair (e.g., having the index t1) are determined and their difference is set as the pressure prediction error. Generally, the larger the difference is, the greater the pressure prediction error is.

To compute a tilt prediction error at time index t1, the pair of detected contact point and predicted contact point having the time index t1 is determined (e.g., the second detected contact point B 420 and the predicted contact point B' 422). Next, the measured tilt value and the predicted title value corresponding to this pair (e.g., having the index t1) are determined and their difference is set as the tilt prediction error. Generally, the larger the difference is, the greater the tilt prediction error is.

Figure 5:
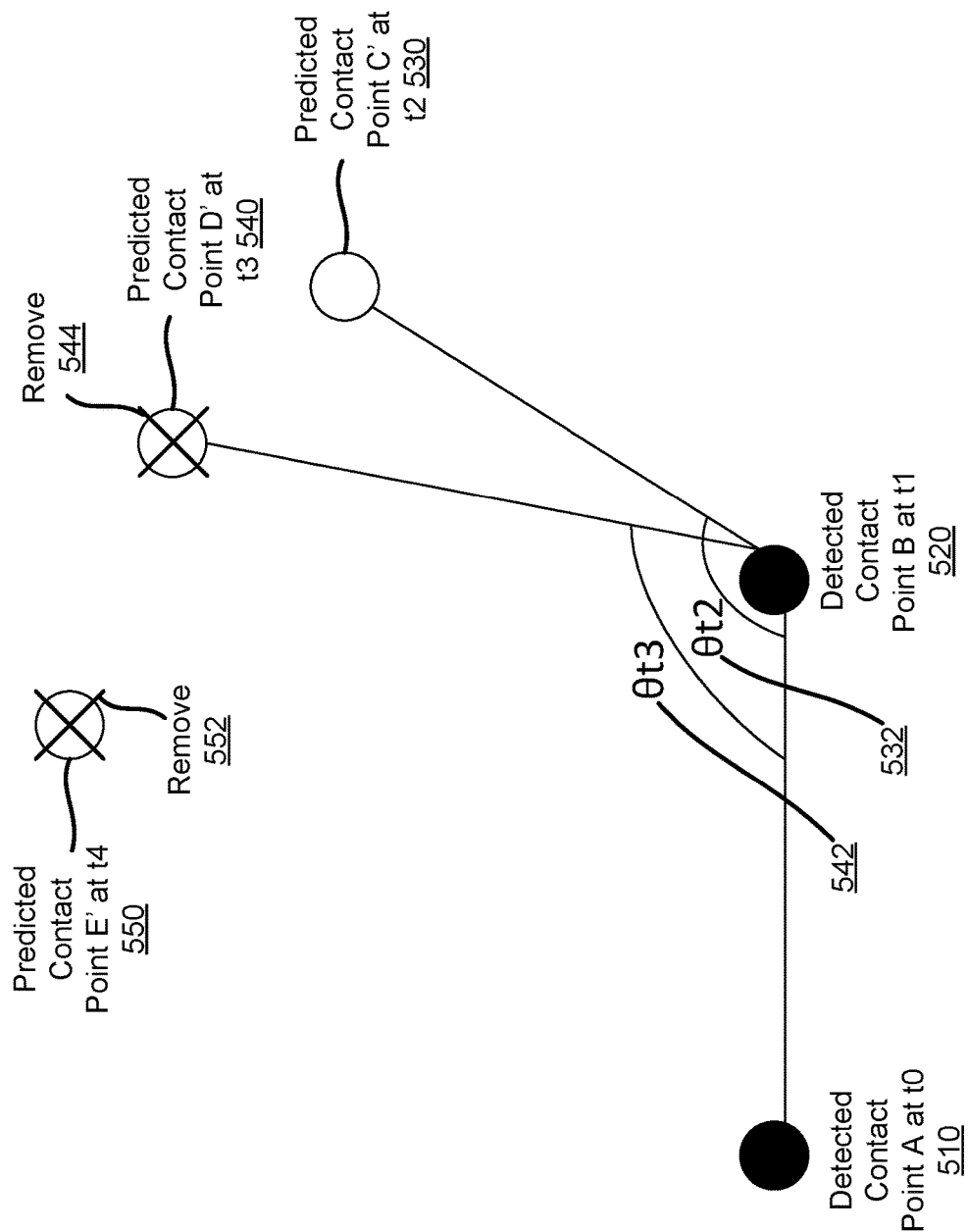
FIG. 5 illustrates an example of an angle-based filtering of predicted contact points, according to embodiments of the present disclosure.

FIG. 5 illustrates an example of an angle-based filtering of predicted contact points, according to embodiments of the present disclosure. In the interest of clarity of explanation, the example is described in connection with five contact points, although a larger number of contact points is possible and can be used for one or more filtering operations. In the example of FIG. 5, two detected points are shown: a first detected contact point A 510 having a time index t0 and a second detected contact point B 520 having a time index t1. Three predicted contact points are also shown for which no contact points have been detected yet: a first predicted contact point C' 530 having a time index t2, a second predicted contact point D' 540 having a time index t3, and a third predicted contact point E' 550 having a time index t4. In this illustration, time index t1 corresponds to the timing of the most recent or up-to-date reporting of measurement data by a touch controller. The angle-based filtering involves computing, in association with a predicted contact point, an angle θ and comparing this angle θ to an angle threshold. As explained herein above, the angle threshold can be a filter setting adjusted based on an error prediction (e.g., one computed using any of the techniques described in FIG. 4). The angle θ formed by the last two most recent detected contact points (e.g., the first detected contact point A 510 and the second detected contact point B 520) and the predicted contact point under consideration.

For the filtering at time index t2, the angle $\theta_{t2}$ 532 is computed. This angle $\theta_{t2}$ 532 is formed by the first detected contact point A 510, the second detected contact point B 520, and the predicted contact point having the time index t2 (e.g., the first predicted contact point C' 530, such that $\theta_{t2}$ is formed by ABC'). Because the angle $\theta_{t2}$ 532 is larger than the angle threshold, the first predicted contact point C' 530 is retained.

For the filtering at time index t3, the angle $\theta_{t3}$ 542 is computed. This angle $\theta_{t3}$ 542 is formed by the first detected contact point A 510, the second detected contact point B 520, and the predicted contact point having the time index t3 (e.g., the second predicted contact point D' 540, such that $\theta_{t3}$ is formed by ABD'). Because the angle $\theta_{t3}$ 542 is smaller than the angle threshold, the first second contact point D' 540 is removed (as illustrated with the "remove 544" operation in FIG. 5).

Because time index t4 is subsequent than time index t3 (e.g., has a larger value indicating a subsequent time) and because the remove 544 operation is applied at time index t3, the third predicted contact point E' having the time index t4 can be automatically removed (as illustrated with the "remove 552" operation in FIG. 5). This type of filtering assumes that, upon filtering out a predicted contact point having a time index $t_i$, any other predicted contact point having a larger time index (e.g., $t_j$, where j>i) should also be automatically filtered out. Alternatively, the relevant angle is computed (e.g., the angle formed by ABE') and compared to the angle threshold.

Figure 6:
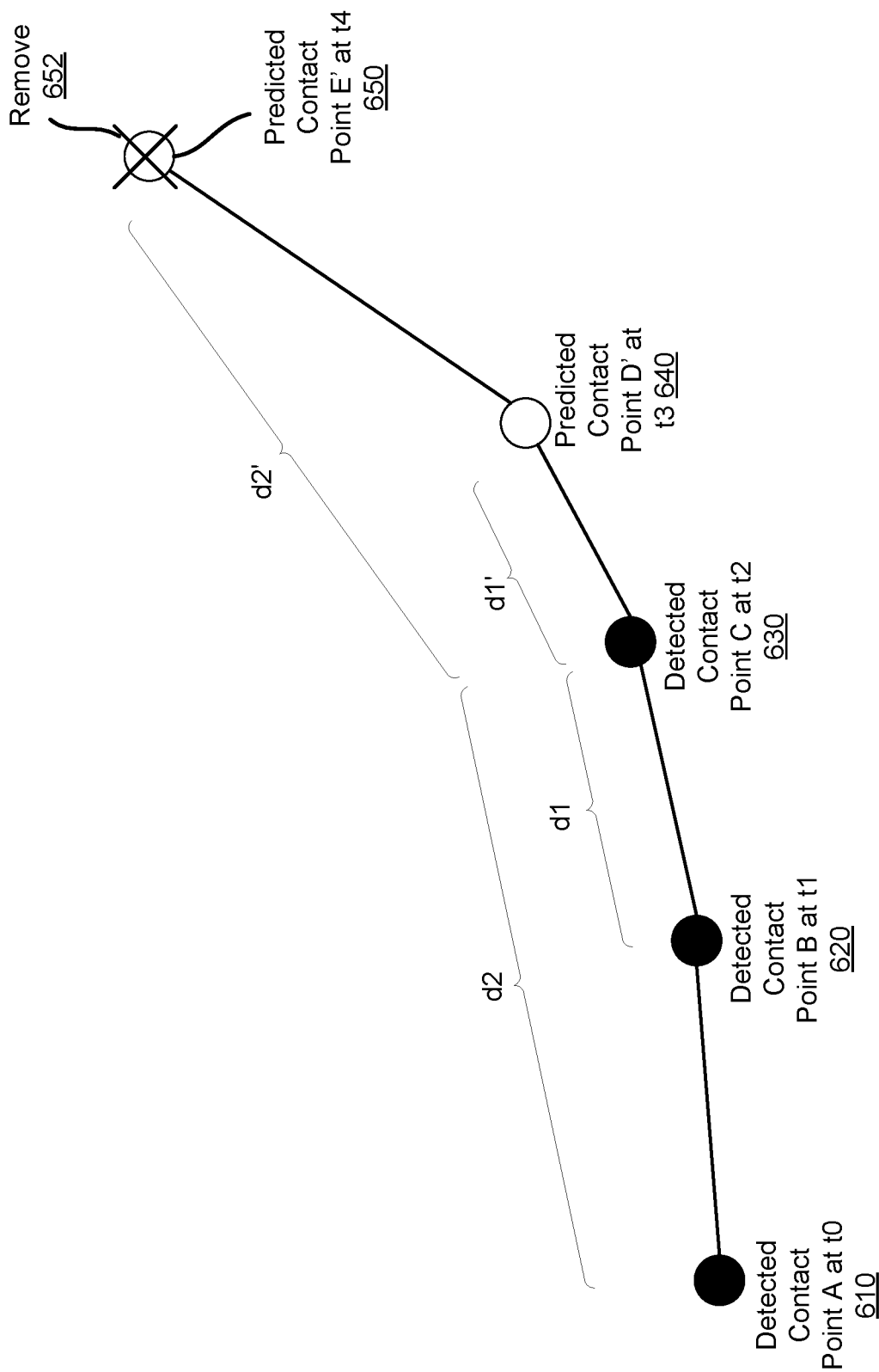
FIG. 6 illustrates an example of a distance-based filtering of predicted contact points, according to embodiments of the present disclosure.

FIG. 6 illustrates an example of a distance-based filtering of predicted contact points, according to embodiments of the present disclosure. In the interest of clarity of explanation, the example is described in connection with five contact points, although a larger number of contact points is possible and can be used for one or more filtering operations. In the example of FIG. 6, three detected points are shown: a first detected contact point A 610 having a time index t0, a second detected contact point B 620 having a time index t1, and a third detected contact point C 630 having a time index t2. Two predicted contact points are also shown for which no contact points have been detected yet: a first predicted contact point D' 640 having a time index t3 and a second predicted contact point E' 650 having a time index t4. In this illustration, time index t2 corresponds to the timing of the most recent or up-to-date reporting of measurement data by a touch controller. The distance based filtering involves computing, in association with a predicted contact point, distances between contact point pairs, determining the difference between the distances, and comparing the difference to a distance threshold. As explained herein above, the angle threshold can be a filter setting adjusted based on an error prediction (e.g., one computed using any of the techniques described in FIG. 4).

For a predicted contact point under consideration, two contact pairs are determined and two corresponding distances are measured. The first contact pair includes the predicted contact pair and the most recent or up-to-date detected contact point. The first distance is between these two contact points. The second contact pair includes the most recent or up-to-date detected contact point and a previously detected contact point being at a time interval away from the most recent or up-to-date detected contact point equal to the time interval by which the predicted contact point is away from the recent or up-to-date detected contact point.

Referring to the illustration of FIG. 6, to determine whether the first predicted contact point D' 640 is to be removed, two contact pairs are determined. The first contact pair includes the first predicted contact point D' 640 and the third detected contact point C 630 (as explained herein above, time index t2 is illustrated as the timing of the most recent or up-to-date reporting of measurement data by the touch controller). The first predicted contact point D' 640 has a time index t3 that is at one increment after the time index t2 of the third detected contact point C 630 (e.g., the first predicted contact point D' 640 is at +4 milliseconds away from the third detected contact point C 630). In comparison, the second detected contact point B 620 has a time index t1 that is at one increment before the time index t2 of the third detected contact point C 630 (e.g., the second detected contact point B 620 is at −4 milliseconds away from the third detected contact point C 630). Accordingly, the second pair includes the second detected contact point B 620 and the third detected contact point C 630.

A first distance $d_1'$ between the first predicted contact point D' 640 and the third measured contact point C 630 is computed based on their position data (e.g., as a Euclidean distance between them). Similarly, a second distance $d_1$ between the second detected contact point B 620 and the third measured contact point C 630 is computed based on their position data (e.g., as a Euclidean distance between them). A distance measure is compared to the distance threshold. The difference measure can be a difference between the two distances (e.g., $d_1'-d_1$ or $d_1-d_1'$) or a ratio of the two distances (e.g., $d_1'/d_1$ or $d_1/d_1'$) Based on the result of the comparison (e.g., $d_1'-d_1$ or the ratio $d_1'/d_1$ being smaller than the difference threshold), the first predicted contact point D' 640 is retained.

In comparison, for the filtering of the second predicted contact points E' 650, the first contact point pair includes the second predicted contact points E' 650 and the third detected contact point C 630, whereas the second contact point pair includes the first detected contact points A 610 and the third detected contact point C 630 given the time indexes t0, t2, and t4. Given these two contact point pairs, two distance are determined: a first distance $d_2'$ between the second predicted contact point E' 650 and the third measured contact point C 630 and a second distance $d_2$ between the first detected contact point A 610 and the third measured contact point C 630. A distance measure is determined from the two distances and is compared to the distance threshold. Based on the result of the comparison (e.g., $d_2'-d_2$ or the ratio $d_2'/d_2$ being larger than the distance threshold), the second predicted contact point E' 640 is removed (as shown with a "remove 652" operation in FIG. 6). Like in the angle-based filtering, a predicted contact point having a time index subsequent to a predicted contact point determined to be removed can also be automatically removed without the need to compute the relevant distances.

In an example, the threshold distance can be a function of a distance multiplier and the actual measured distance between two detected contact points (e.g., $d_1$ when the first predicted contact point D' 640 is being filtered, and $d_2$ when the second predicted contact point E' 650 is being filtered). The distance multiplier can be adjusted depending on the prediction error (e.g., decreased with an increase to the prediction error) and can have an upper limit (e.g., "four"). Assuming this multiplier is set to a value v between zero and four, when the first predicted contact point D' 640 is being filtered, the distance measure is compared to "distance thresold=$v \times d_1$." In comparison, when the second predicted contact point E' 650 is being filtered, the distance measure is compared to "distance thresold=$v \times d_2$."

Although FIGS. 5 and 6 describe angle and distance-based filtering, other types of filtering are possible. For example, pressure-based filtering and/or tilt-based filtering are also possible. As far as pressure-based filtering, this technique can involve comparing, to a pressure threshold, a predicted pressure value associated with a predicted contact point for which no contact point has been detected yet. If the predicted pressure value is larger than the pressure threshold, the predicted contact point can be removed (and, optionally, predicted contact points that have subsequent time indexes can be automatically removed). Similarly, the tilt-based filtering can involve comparing, to a tilt threshold, a predicted tilt value associated with a predicted contact point for which no contact point has been detected yet. If the predicted tilt value is larger than the tilt threshold, the predicted contact point can be removed (and, optionally, predicted contact points that have subsequent time indexes can be automatically removed). The pressure threshold and the tilt threshold are examples of filter settings and can be adjusted based on the prediction error.

Furthermore, although FIGS. 5 and 6 describe using the angle-based filtering and the distance-based filtering as two separate techniques, these techniques can be used in conjunction with each other and/or with other filtering techniques (e.g., with pressure and/or tilt-based filtering). For instance, a restrictive approach can be implemented, where a predicted contact point is removed if any of the filtering techniques indicates that the predicted contact point should be removed, and where a predicted contact point is retained only if all of the filtering techniques indicate that the predicted contact point should be retained.

FIGS. 7-12 illustrate flows associated with adaptive predictions, according to embodiments of the present disclosure. Some or all of the flows may be performed by a computing device, such as the computing device 120 in FIG. 1, configured with executable instructions and may be implemented as code (e.g., executable instructions, one or more computer programs, or one or more applications) executing collectively on one or more processors, by hardware or combinations thereof. The code may be stored on one or more non-transitory computer-readable storage media of a computing device, for example, in the form of a computer program comprising a plurality of instructions executable by the one or more processors. While the operations of the flows are illustrated in a particular order, it should be understood that no particular order is necessary and that one or more operations may be omitted, skipped, performed in parallel, and/or reordered.

Figure 7:
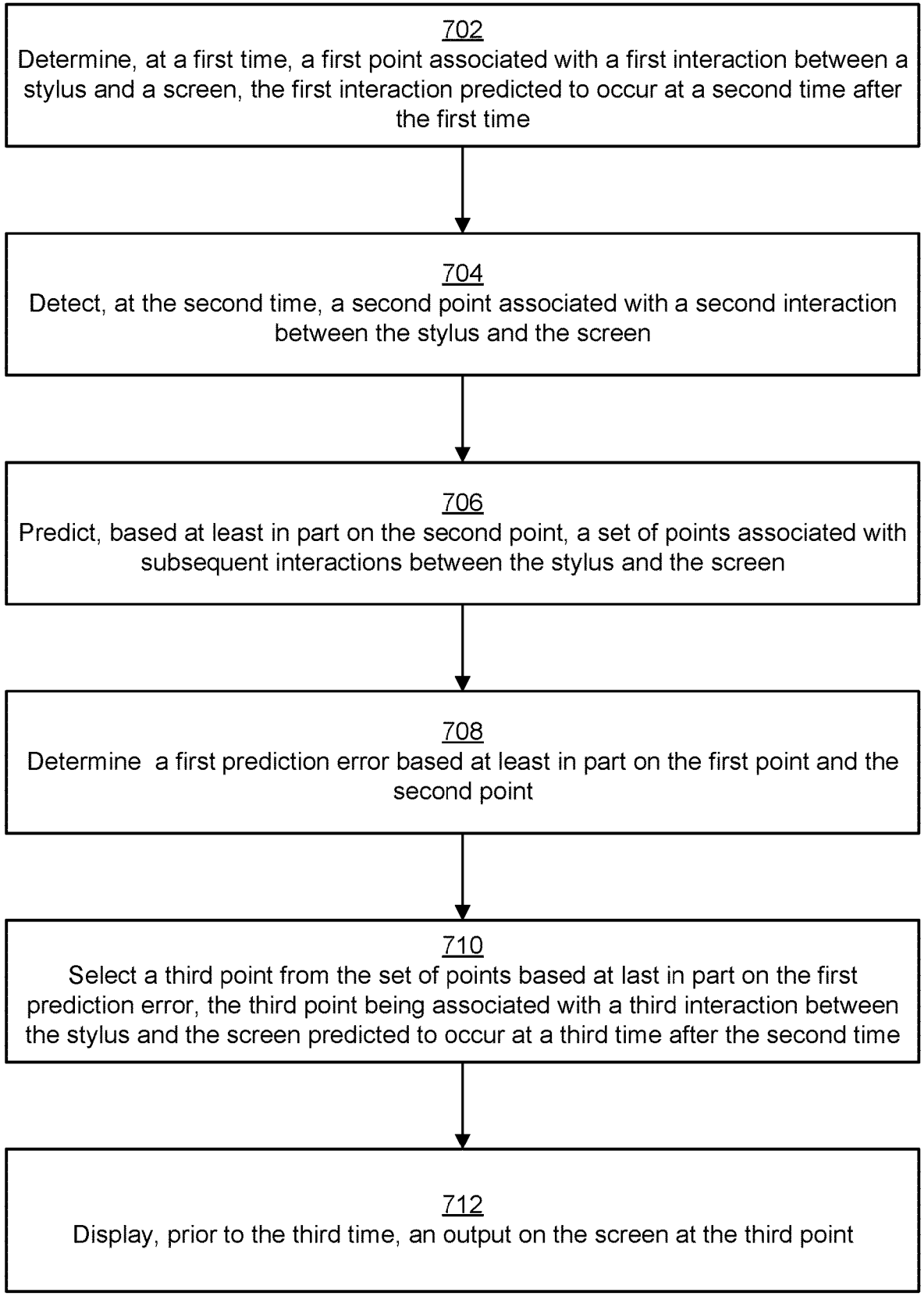
FIG. 7 illustrates an example of a flow for predicting points on a screen, according to embodiments of the present disclosure.

FIG. 7 illustrates an example of a flow for predicting points on a screen, according to embodiments of the present disclosure. As illustrated, the flow may start at operation 702, where the computing device determines at a first time, a first point associated with a first interaction (e.g., a first contact) between a stylus and a screen, the first interaction predicted to occur at a second time after the first time. For example, a first prediction algorithm, such as a curve fitting algorithm, an LSTM neural network algorithm, or a linear algorithm is executed on the computing device. The first prediction algorithm outputs, at the first time, first predicted data in the form of, for instance, first time-series data indicating (x,y) coordinates among other data (e.g., predicted pressure data and/or predicted tilt data) of predicted points over a first time period, where these predicted points are time indexed. The first point corresponds to one of the predicted points, and the second time corresponds to a first time index (e.g., t1).

The flow may also include operation 704, where the computing device detects, at the second time, a second point associated with a second interaction (e.g., a second contact) between the stylus and the screen. For example, a touch controller outputs measured data in the form of, for instance, second time-series data indicating (x,y) coordinates among other data (e.g., detected pressure data and/or detected tilt data) of detected points, where these detected points are time indexed. The second point corresponds to one of the detected points and is associated with the first time index (e.g., t1).

The flow may also include operation 706, where the computing device predicts, based at least in part on the second point, a set of points associated with subsequent interactions between the stylus and the screen. For example, the measured data is used as input to the first prediction algorithm. In turn, the first prediction algorithm outputs second predicted data in the form of, for instance, third time-series data indicating (x,y) coordinates among other data (e.g., predicted pressure data and/or predicted tilt data) of predicted points over a second, next time period, where these predicted points are time indexed. The set corresponds to the predicted points.

The flow may also include operation 708, where the computing device determines a first prediction error based at least in part on the first point and the second point. For example, a prediction error is computed by determining a distance between the first point and the second point based on the corresponding (x,y) coordinates of these two points. In an addition, the prediction error is computed by determining an angle formed by the first point, the second point, and a fourth point based on the corresponding (x,y) coordinates of these three points. The fourth point can be a detected point that the touch controller detected at a third time prior to the first time. For instance, the fourth point is one of the detected points of the second time-series data, where this detected point is associated with a time index smaller than the first time index (e.g., t0). Additionally, the predicted pressure data associated with the first point and the detected pressure data associated with the second point can be compared to determine a pressure error, and/or the predicted tilt data associated with the first point and the detected tilt data associated with the second point can be compared to determine a tilt error. The first prediction error can also be a function of the pressure error and/or the tilt error.

The flow may also include operation 710, where the computing device selects the third point from the set of points based at last in part on the first prediction error, where the third point is associated with a third interaction (e.g., a third contact) between the stylus and the screen predicted to occur at a third time after the second time. For instance, the third point corresponds to one of the predicted points, and the third time corresponds to a second time index (e.g., t2). In one example, a second prediction algorithm is also executed on the computing device in parallel to the execution of the first prediction algorithm. In this case, a second prediction error corresponding to this second prediction algorithm is computed. This computation can be similar to the above. In particular, a fifth point associated with a fifth interaction (e.g., a fifth contact) predicted to occur at the second time is determined based on the output of the second prediction algorithm for the first time period. The distance of the fifth point to the second point can be computed. The angle formed by the fifth point, the fourth point, and the second point is computed. The second prediction error is computed based on the distance and the angle. Further, predicted pressure and/or tilt data associated with the fifth point and detected pressure and/or tilt data associated with the second point can be used in the computation of the second prediction error. The first prediction error and the second prediction error are compared. Assuming that the first prediction error has the smaller prediction error, the first prediction algorithm is selected instead of the second prediction algorithm for further processing of predicted points over the second, next time period. Accordingly, the set of points that is output by the first prediction algorithm is selected instead of a second set of prediction points that is output by the second prediction algorithm for the next, second time period. The third point is selected by way of selecting the set. In the same example or an alternative example, filtering is applied to the set of points, whereby the third point is retained based on a filter, and a sixth point and a seventh point of the set are removed based on the filter. The sixth point is associated with a sixth interaction (e.g., a sixth contact) between the stylus and the screen predicted to occur at a sixth time subsequent to the third time (e.g., has a time index t3), and the seventh point is associated with a seventh interaction (e.g., a seventh contact) between the stylus and the screen predicted to occur at a seventh time subsequent to the sixth time (e.g., has a time index t4). In particular, the first prediction error is compared with a prediction error threshold or a previously computed prediction error. A threshold value of the filter is determined based at least in part on this comparing. The threshold value can be for a distance threshold, an angle threshold, a pressure threshold, and/or a tilt threshold. Generally, the threshold value is increased from a first value to a second value when the comparing indicates that the first prediction error exceeds the prediction error threshold or the previously computed prediction error such that the filter becomes more restrictive. Conversely, the threshold value is decreased from the first value to a third value when the comparing indicates that the first prediction error is smaller than the prediction error threshold or the previously computed prediction error such that the filter becomes less restrictive. Assuming that the threshold value is increased to the second value, the third point is selected based at least in part on the second value, whereas the sixth point is removed based at least in part on the second value, and the seventh point is removed based at least in part on the seventh interaction being predicted to be detected at a seventh time subsequent to the sixth time. Determining that the third point is to be retained can include, for instance, computing a first distance between the third point and the second point and a second distance between the fourth point and the second point and comparing a distance measure (e.g., a difference between the first distance and the second distance, or a ratio of the first distance and the second distance) to the second value (e.g., to the threshold value of the distance threshold). Determining that the third point is to be retained can also or alternatively include, for instance, computing a first angle formed by the third point, the second point, and the fourth point and comparing the angle to the second value (e.g., to the threshold value of the angle threshold). Predicted pressure data and/or tilt data of the third point can also be compared to a pressure threshold value and/or tilt threshold value of the filter. Determining that the sixth point is to be removed can include, for instance, computing a third distance between the sixth point and the second point and a fourth distance between an eighth point and the second point and comparing a distance measure (e.g., a difference between the third distance and the fourth distance, or a ratio of the third distance and the fourth distance) to the second value (e.g., to the threshold value of the distance threshold). The eighth point can have a time index smaller than the time index of the second point. In particular, the second point can be, in the time domain, the middle point between the eighth point and the sixth point. Determining that the sixth point is to be removed can also or alternatively include, for instance, computing a second angle formed by the sixth point, the second point, and the fourth point and comparing the second angle to the second value (e.g., to the threshold value of the angle threshold). Predicted pressure data and/or tilt data of the sixth point can also be compared to a pressure threshold value and/or tilt threshold value of the filter The flow may also include operation 712, where the computing device displays, prior to the third time, an output on the screen at the third point. For example, the (x,y) coordinates of the third point are used to determine the set of pixels on the screen corresponding to the third point and the output is presented by the set of pixels. The size of this set can be set based on the predicted pressure associated with the third point (e.g., the output on the screen is presented with a larger width when the predicted pressure is relatively large). RGB values of the set of pixels can be set based on the predicted tilt associated with the third point. Continuing with the illustration above, the set of points can include a plurality of points including the sixth and seventh point described herein above, in addition to the third point. Based on the filtering, one or more of the points are removed (e.g., the sixth and seventh points), resulting in remaining points that are not removed from the set and that include the third point. Prior to the third time, a line is displayed on the screen, where the line connects the remaining points from the set of points.

Figure 8:
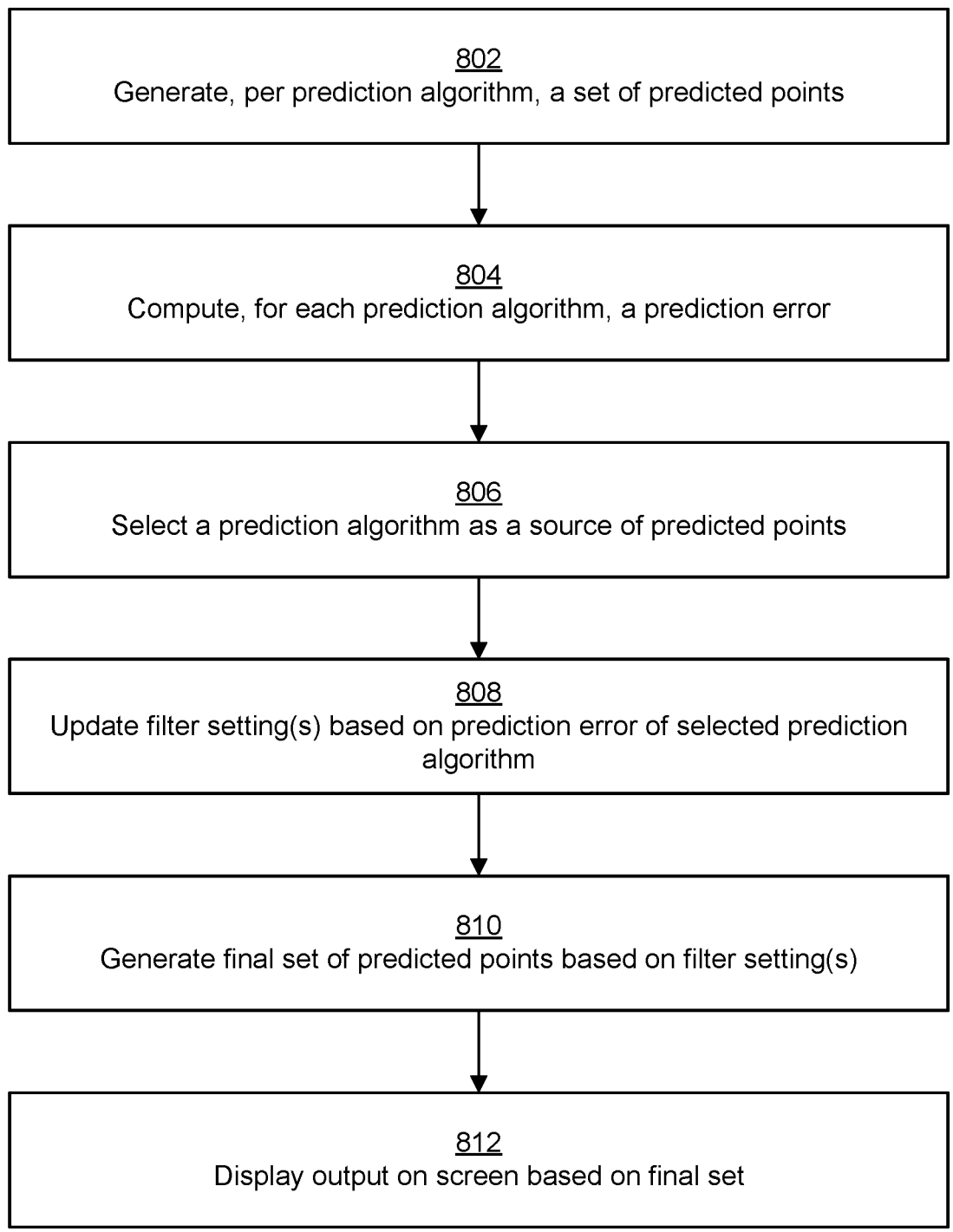
FIG. 8 illustrates an example of a flow for adaptive predictions of contact points on a screen of a computing device, according to embodiments of the present disclosure.

FIG. 8 illustrates an example of a flow for adaptive predictions of contact points on a screen of the computing device, according to embodiments of the present disclosure. Operations of the flow can be implemented as sub-operations of the flow of FIG. 7. As illustrated in FIG. 8, the flow may start at operation 802, where the computing device generates, per prediction algorithm a set of predicted points. For example, multiple prediction algorithm may be executing in parallel on the computing device. Measured data about contact points detected on the screen in a last time period (e.g., the last seven detected contact points in the last 28 milliseconds) is input to each of the prediction algorithm. In turn, each prediction algorithm outputs predicted data indicating contact points predicted on the screen excepted during a next time period (e.g., seven predicted contact points in the next 28 milliseconds).

The flow may also include operation 804, where the computing device computes, for each prediction algorithm, a prediction error associated with the last time period. For example, each detected contact point occurring in the last time period also has a predicted contact point that was generated by each prediction algorithm. The detected contact point and the corresponding predicted contact point per prediction algorithm form a contact point pair. The measured data and the predicted data of this pair is used to compute an individual prediction error such as one or a combination of a distance prediction error, angle prediction error, pressure prediction error, or tilt prediction error. As such, per prediction algorithm, multiple prediction errors are computed in association with the last time period. A statistical measure, such as a maximum, an average, or a weighted average is applied thereto to generate the prediction error of each prediction algorithm.

The flow may also include operation 806, where the computing device selects a prediction algorithm as a source of predicted points. For example, the prediction errors that were computed at operation 808 are compared. The prediction algorithm having the smallest prediction error is selected. The output of the selected prediction algorithm is set as the source of the predicted points. This output includes predicted data for the next time period, where the predicted data indicates the position, pressure, and/or tilt of the next "m" predicted contact points expected during the next time period.

The flow may also include operation 808, where the computing device updates one or more filter setting based on the prediction error of the selected prediction algorithm. The one or more filter settings can include, for example, a distance threshold, an angle threshold, a pressure threshold, and/or a tilt threshold. Generally, the larger the prediction error is, the more restrictive the filter setting(s) can become. In particular, with an increase to the prediction error, the distance threshold (or a multiplier used therein as described in FIG. 6) can be decreased from a first value to a second value, the angle threshold can be increased from a first value to a second value, the pressure threshold can be decreased from a first value to a second value, and/or the tilt threshold can be decreased from a first value to a second value. The increase to the prediction error can be determined in multiple ways. In one example, the prediction error is compared to a prediction error threshold. If exceeding this threshold, the prediction error is determined to have increased. In another example, the prediction error is tracked over time. In this example, the prediction error of the last time period is compared to that of the time period occurring before it or to a historical average to determine an increase, a decrease, or no change as the case may be.

The flow may also include operation 810, where the computing device generates a final set of predicted points based on the filter setting(s). For example, the predicted data of the "m" contact points expected during the next time period along with measured data of detected contact points occurring during the last time period are used as filtering data. The filtering data can be processed for comparison with the distance threshold, angle threshold, pressure threshold, and/or tilt threshold. This processing can be performed according to distance-based filtering, angle-based filtering, pressure-based filtering, and/or tilt-based filtering as described herein above. The filtering results in removing particular predicted contact points and retaining "n" predicted contact points.

The flow may also include operation 812, where the computing device displays an output (or a portion of an output) on the screen based on the final set. For instance, the predicted data about the remaining "n" predicted contact points are input to an application executing on the computing device. In turn, the application presents a line(s) or a portion(s) thereof at the "n" remaining contact points. The position data of the remaining "n" predicted contact points can be used to determine the location for presenting the line(s) or the portion(s). In comparison, the pressure data and the tilt data of the remaining "n" predicted contact points can be used to determine the thickness and shade of the line(s) or the portion(s).

Figure 9:
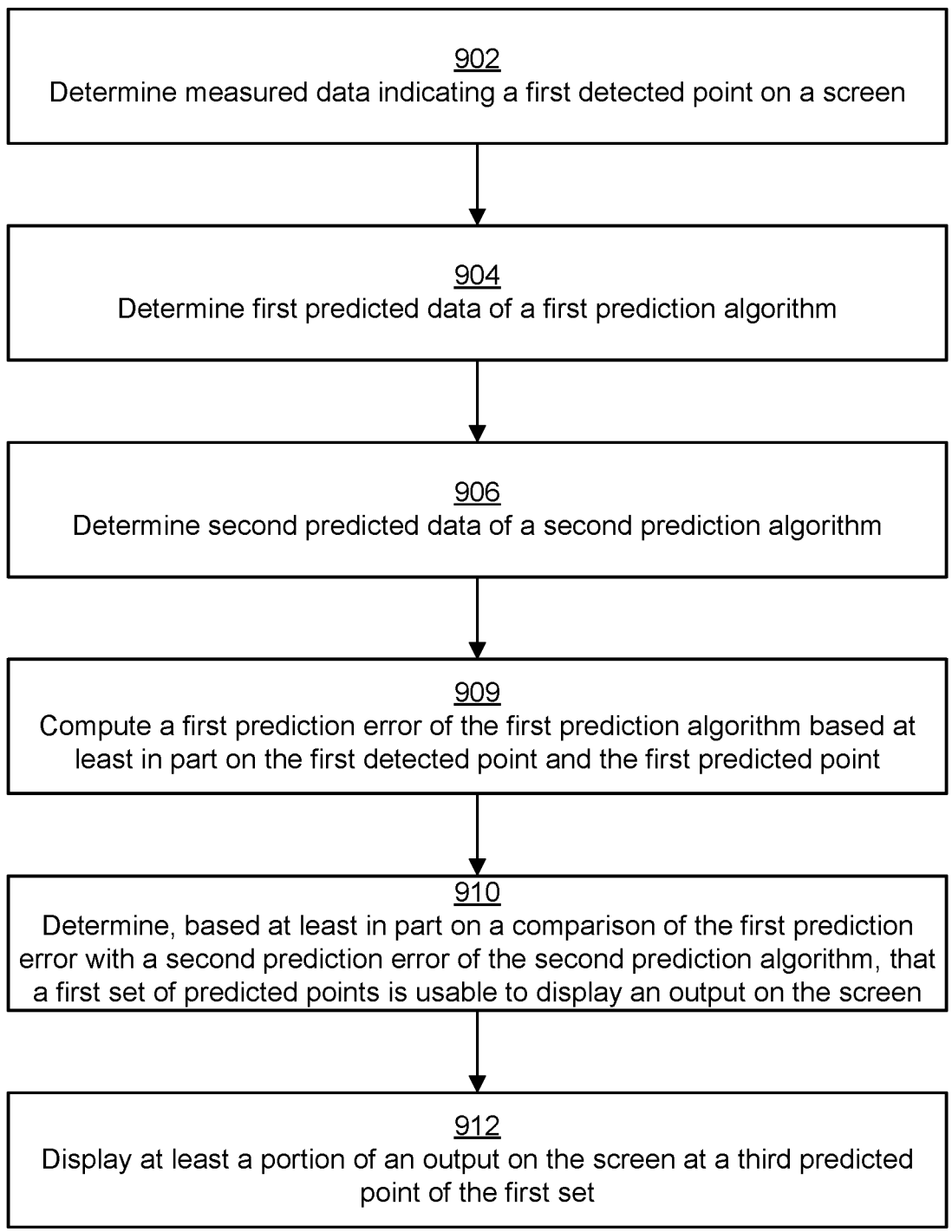
FIG. 9 illustrates an example of a flow for selecting a prediction algorithm, according to embodiments of the present disclosure.

FIG. 9 illustrates an example of a flow for selecting a prediction algorithm, according to embodiments of the present disclosure. Some operation of the flow of FIG. 9 can be implemented as sub-operations of the flow of FIG. 8 and/or can be similar to operations of the flow of FIG. 8. Similarities are not repeated herein in the interest of brevity and equivalently apply to the flow of FIG. 9. As illustrated, the flow of FIG. 9 may start at operation 902, where the computing device determines measured data indicating a first detected point on a screen (e.g., a first contact point detected on a touchscreen). For example, the measured data is output by a touch controller at a particular reporting rate (e.g., 250 Hz) and is stored in a buffer (e.g., a first FIFO buffer that corresponds to the touch controller) as first time-series data. The time-series data includes a time index of the detected contact point.

The flow may also include operation 904, where the computing device determines first predicted data of a first prediction algorithm. For example, the first predicted data indicates a first predicted point on the screen (e.g., a first contact point predicted on the touchscreen), is output by the first prediction algorithm at a particular rate (e.g., also 250 Hz), and is stored in a buffer (e.g., a second FIFO buffer that corresponds to the first prediction algorithm) as second time-series data. This time series-data includes a time index of the predicted point. This time index can be the same as the time index of the detected point and, as such, the predicted point and the detected point form a first pair of contact points.

The flow may also include operation 906, where the computing device determines second predicted data of a second prediction algorithm. For example, the second prediction algorithm is executed in parallel to the execution of the first prediction algorithm. The second predicted data indicates a second predicted point on the screen, is output by the second prediction algorithm at a particular rate (e.g., also 250 Hz), and is stored in a buffer (e.g., a third FIFO buffer that corresponds to the second prediction algorithm) as third time-series data. This time series-data includes a time index of the predicted point. This time index can be the same as the time index of the detected point of and, as such, the predicted point and the detected point form a second pair of contact points.

The flow may also include operation 908, where the computing device computes a first prediction error of the first prediction algorithm based at least in part on the first detected point and the first predicted point. For example, an individual prediction error is computed for each pair of detected point and predicted point belonging to the last time period, where the detected points are indicated by the output of the touch controller and stored in the first time-series data, and where the predicted points are indicated by the output of the first prediction algorithm and stored in the second time-series data. The individual prediction error per pair can be any or a combination of distance prediction error, angle prediction error, pressure prediction error, or tilt prediction error. A statistical measure is applied to the individual prediction errors in order to generate the prediction error of the first prediction algorithm, where this error is associated with the last time period.

The flow may also include operation 910, where the computing device determines, based at least in part on a comparison of the first prediction error with a second prediction error of the second prediction algorithm, that a first set of predicted points is usable to display an output on the screen. For example, the second prediction error is computed in a similar manner as the computation of operation 908, except that the predicted points indicated by the output of the second prediction algorithm are used. The two prediction errors are compared and, in case the first prediction error is the smaller, the first prediction algorithm is selected as the source of the predicted points of the next time period. Accordingly, the first includes predicted data points indicated by the output of the first prediction algorithm, where these predicted data points belong to the next time period.

The flow may also include operation 912, where the computing device displays at least a portion of an output on the screen at a third predicted point of the first set. For example, filtering may be applied to remove one or more predicted of the first set. The remaining "n" predicted points include the third contact point and are used to draw a line that connects them.

Figure 10:
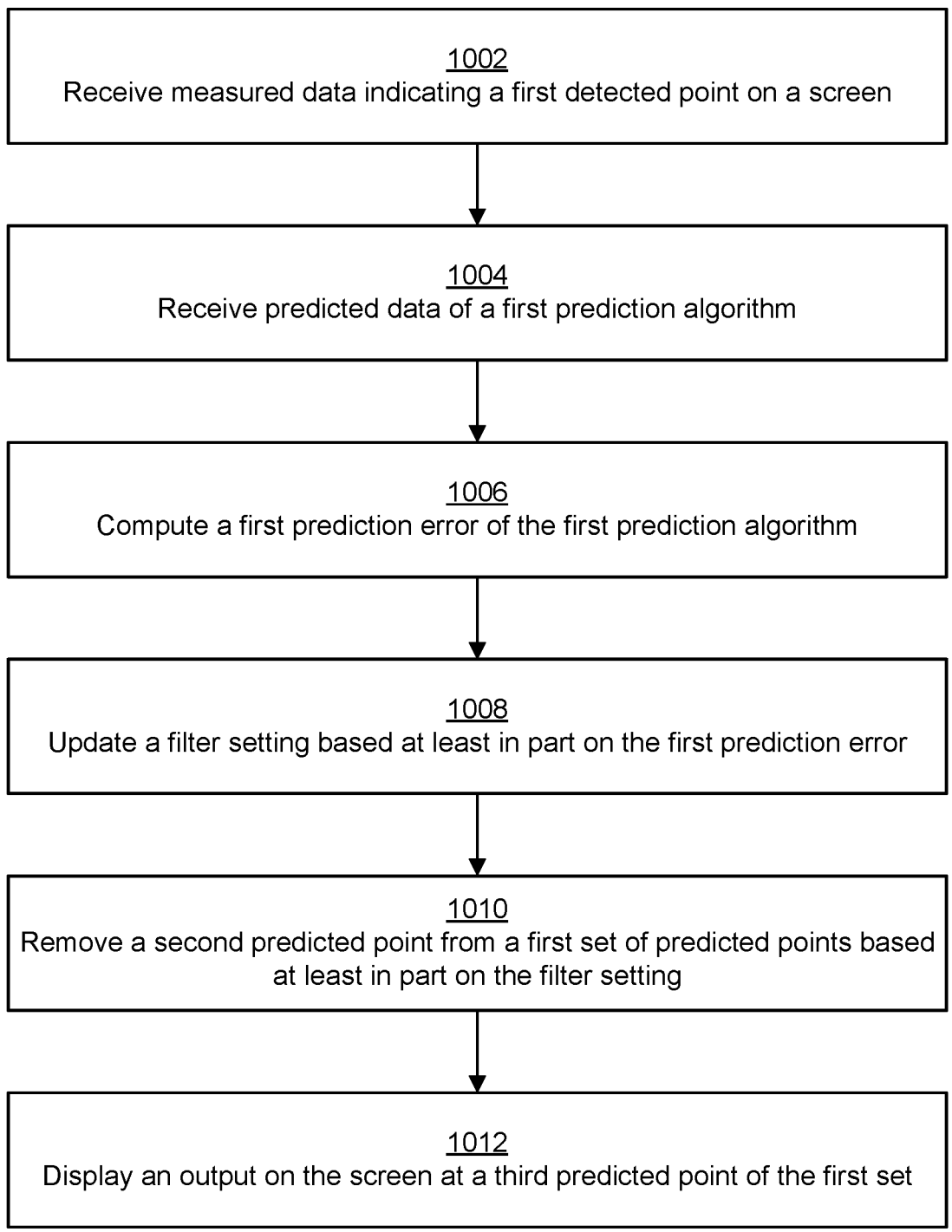
FIG. 10 illustrates an example of a flow for filtering predicted contact points, according to embodiments of the present disclosure.

FIG. 10 illustrates an example of a flow for filtering predicted contact points, according to embodiments of the present disclosure. Some operation of the flow of FIG. 10 can be implemented as sub-operations of the flow of FIG. 8, as additional operation of the flow of FIG. 9, and/or can be similar to operations of the flows of FIGS. 8 and 9. Similarities are not repeated herein in the interest of brevity and equivalently apply to the flow of FIG. 10. As illustrated, the flow of FIG. 10 may start at operation 1002, where the computing device receives measured data indicating a first detected point on a screen (e.g., a first contact point detected on a touchscreen). For example, the measured data is received from a touch controller or from a buffer that stores the output of such a controller. This data is measured time-series data. This time-series data includes a time index of the detected contact point.

The flow may also include operation 1004, where the computing device receives predicted data of a first prediction algorithm. For example, the predicted data indicates a first predicted point on the screen (e.g., a first contact point predicted on the touchscreen), is output by the first prediction algorithm at a particular rate (e.g., also 250 Hz), and is received from the first prediction algorithm or from a buffer that stores the output of the first prediction algorithm. This data can be second predicted time-series data that includes a time index of the predicted point. This time index can be the same as the time index of the detected point and, as such, the predicted point and the detected point form a first pair of contact points.

The flow may also include operation 1006, where the computing device computes a first prediction error of the first prediction algorithm based at least in part on the first detected point and the first predicted point. This operation 1006 can be similar to the operation 908 of FIG. 9. When the two flows are used in conjunction, operation 1006 need not be repeated. Instead, the first prediction error can be retrieved from memory.

The flow may also include operation 1008, where the computing device updates a filter setting based at least in part on the first prediction error. For example the filter setting includes any or a combination of a distance threshold, angle threshold, pressure threshold, or tilt threshold. As explained herein above, depending on the prediction error, the values of such thresholds can be increased or decreased. Generally, if the first prediction error exceeds a prediction error threshold or has increased over time, the distance threshold, the pressure threshold, or the tilt threshold can be reduced, whereas the angle threshold can be increased.

The flow may also include operation 1010, where the computing device removes a second predicted point from a first set of predicted points based at least in part on the filter setting. In an example, the first set corresponds includes "m" predicted points by the first prediction algorithm for the next time period. For each of such predicted points, any or a combination of a distance, angle, pressure, or tilt are computed for comparison to the filter setting. "n" predicted points of the "m" predicted points are retained, while the remaining ones, including the second predicted point, are removed. In this example, any predicted point that belongs to the next time period and that has a time index larger than that of the second predicted point can also be automatically removed.

The flow may also include operation 1012, where the computing device displays at least a portion of an output on the screen at a third predicted point of the first set. This operation can be similar to operation 912 of FIG. 9.

Figure 11:
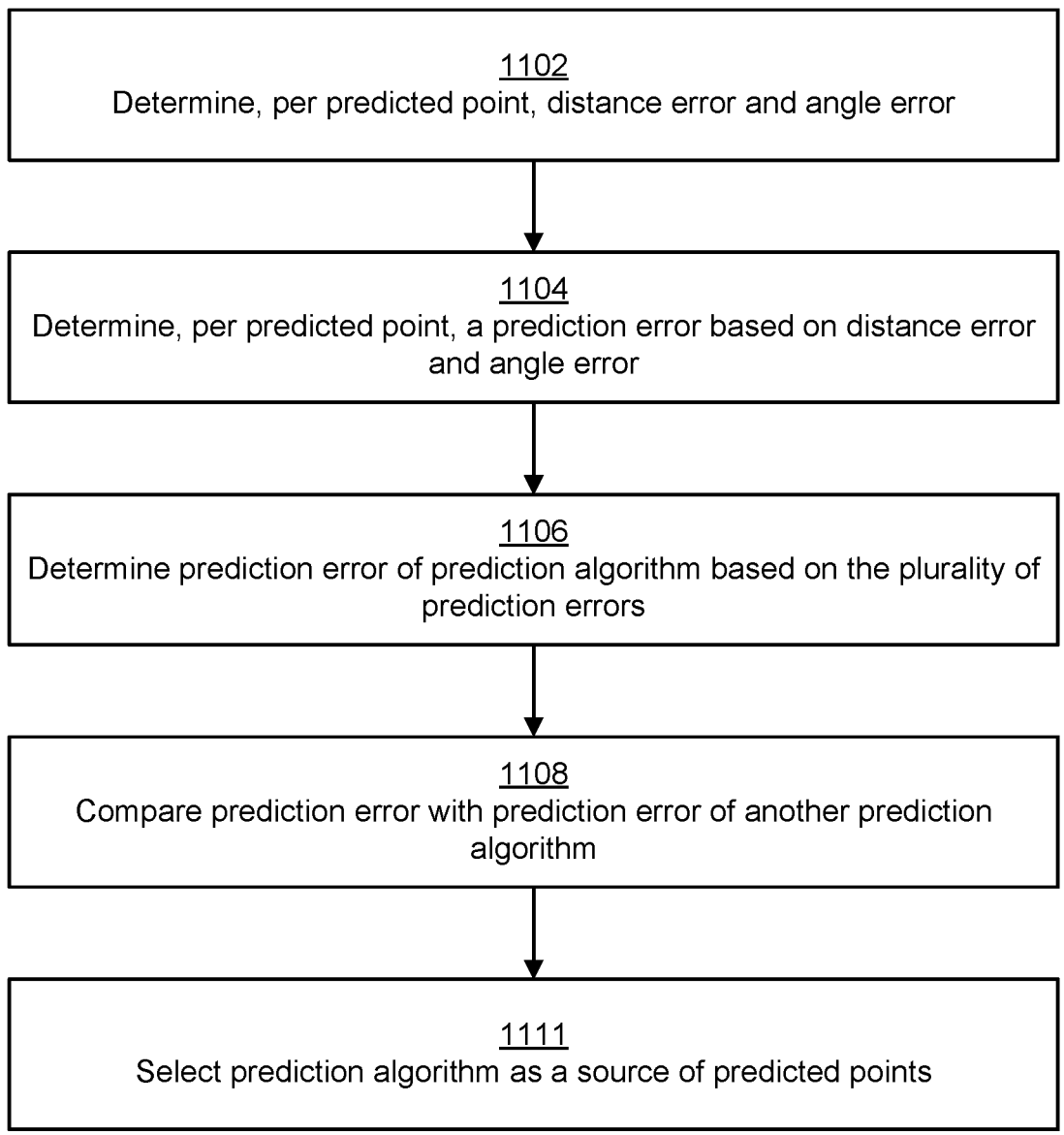
FIG. 11 illustrates an example of a flow for computing prediction errors, according to embodiments of the present disclosure.

FIG. 11 illustrates an example of a flow for computing prediction errors, according to embodiments of the present disclosure. Some operation of the flow of FIG. 11 can be implemented as sub-operations of the flows of FIGS. 8 and 9 and/or can be similar to operations of the flows of FIGS. 8 and 9. Similarities are not repeated herein in the interest of brevity and equivalently apply to the flow of FIG. 11. As illustrated, the flow of FIG. 11 may start at operation 1102, where the computing device determines, per predicted point of a time period (e.g., the last time period of 28 milliseconds that includes seven predicted points for which detected points have been measured), a distance error and an angle error. The predicted points can be indicated by an output of a prediction algorithm. A first predicted point is associated with a time index that belongs to the last time period. A first detected point having that time index is also determined and forms, along with the first predicted point, a pair of points. The distance between the pair is computed and this distance corresponds to the distance error. Further, a second detected point associated with the immediately previous time index is identified and an angle formed by the second detected point, the first detected point, and the first predicted point. The angle corresponds to the angle error.

The flow may also include operation 1104, where the computing device determines, per predicted point, a prediction error based on the distance error and the angle error. For example, a prediction error of a predicted point is an individual prediction error that has a scalar value derived by using an algebraic combination of the distance error and the angle error determined at operation 1102 for that predicted point.

The flow may also include operation 1106, where the computing device determines a prediction error of the prediction algorithm based on the plurality of prediction errors determined at operation 1104. For example, the largest individual prediction error is selected as the prediction error of the prediction algorithm and is associated with the last time period.

The flow may also include operation 1108, where the computing device compares the prediction error of the prediction algorithm to another prediction error of another prediction algorithm. The other prediction error can be associated with the same last time period and can be derived for the other algorithm by using operations 1102-1006 in connection with predicted points of the other algorithm.

The flow may also include operation 1110, where the computing device selects the prediction algorithm as the source of predicted points. For example, because the prediction error of the prediction algorithm is smaller than the one of the other algorithm, the prediction algorithm is selected.

Figure 12:
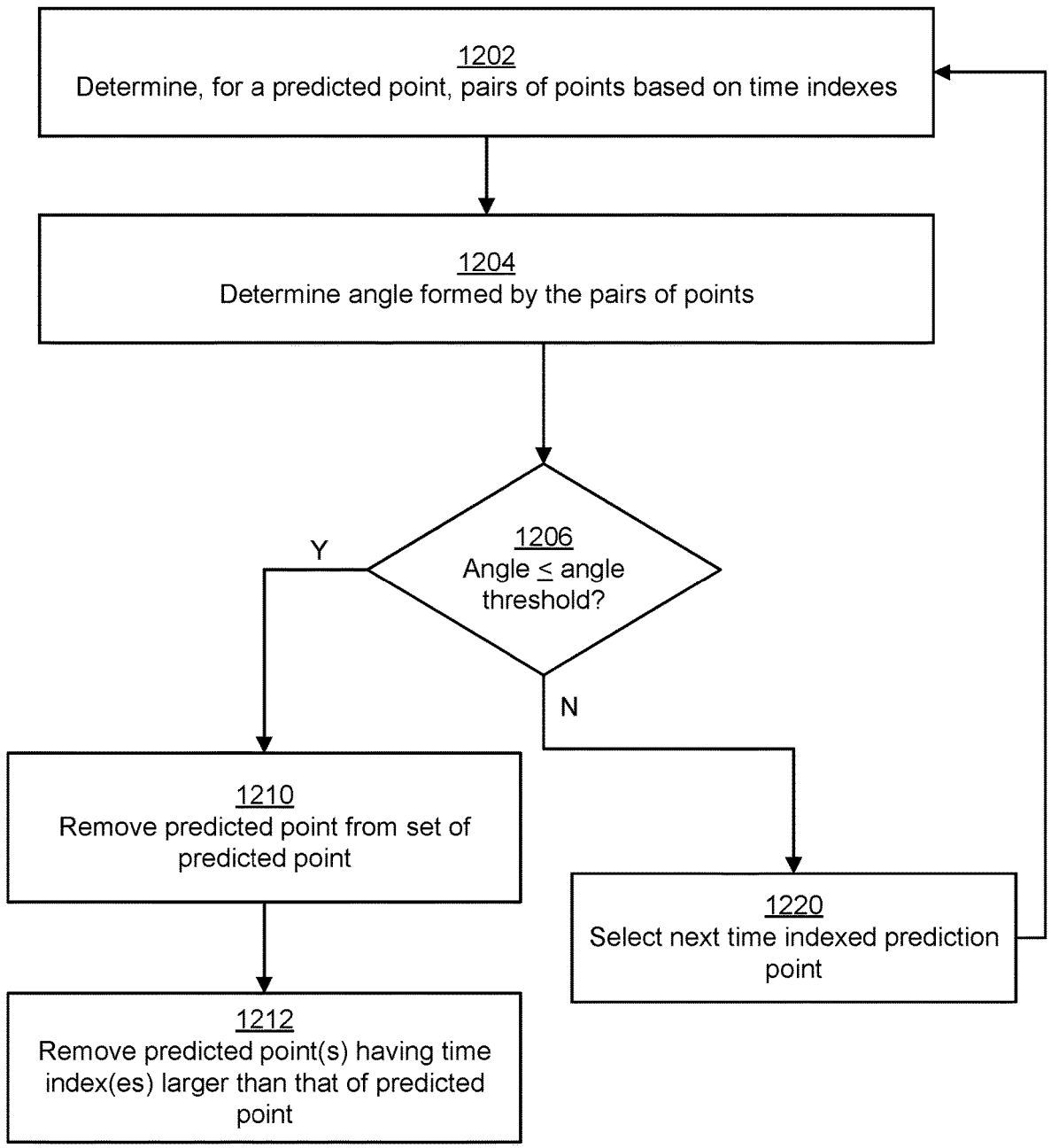
FIG. 12 illustrates an example of a flow for angle-based filtering of predicted contact points, according to embodiments of the present disclosure.

FIG. 12 illustrates an example of a flow for angle-based filtering of predicted contact points, according to embodiments of the present disclosure. Some operation of the flow of FIG. 12 can be implemented as sub-operations of the flow of FIGS. 8 and 10 and/or can be similar to operations of the flows of FIGS. 8 and 10. Similarities are not repeated herein in the interest of brevity and equivalently apply to the flow of FIG. 12. As illustrated, the flow of FIG. 12 may start at operation 1202, where the computing device determines, for a predicted point of a prediction algorithm, pairs of points based on time indexes. A first pair includes a first detected point having the most recent time index and a second detected point having the time index that immediately precedes the most recent time index. A second pair includes the first detected point and the predicted point. The two detected points belong to the last time period, whereas the predicted point corresponds to the next time period.

The flow may also include operation 1204, where the computing device determines an angle formed by the pairs of points. For example, the angle formed by the second detected point, the first detected point, and the predicted point is computed by using position data of these three points and this angle corresponds to an angle error.

The flow may also include operation 1206, where the computing device compares the angle to an angle threshold. In an example, the prediction error determined for the prediction algorithm and associated with the last time period is used to adjust the angle threshold. Once this threshold is adjusted, the angle computed at operation 1204 is compared therewith. If smaller or equal to the angle threshold, operation 1210 can follow operation 1206. Otherwise, operation 1220 can be performed.

The flow may also include operation 1210, where the computing device removes the predicted point from the set of predicted points usable to present an output on a screen. For example, the predicted data corresponding to this predicted point is not output to a user application that presents the output.

The flow may also include operation 1212, where the computing device removes one or more predicted points having time index(es) larger than that of the predicted point. In an example, because this predicted point is removed, any subsequent predicted point that also belongs to the next time period is automatically removed too.

The flow may also include operation 1220, where the computing device selects the next time indexed prediction point. For example, the time index is incremented by a unit amount (e.g., 4 milliseconds, depending on the prediction rate) and the flow loops back to operation 1202 to process the corresponding next predicted point of the next time period. This looping is repeated until all predicted points of the next time period are processed (e.g., retained or removed as the case may be).

Figure 13:
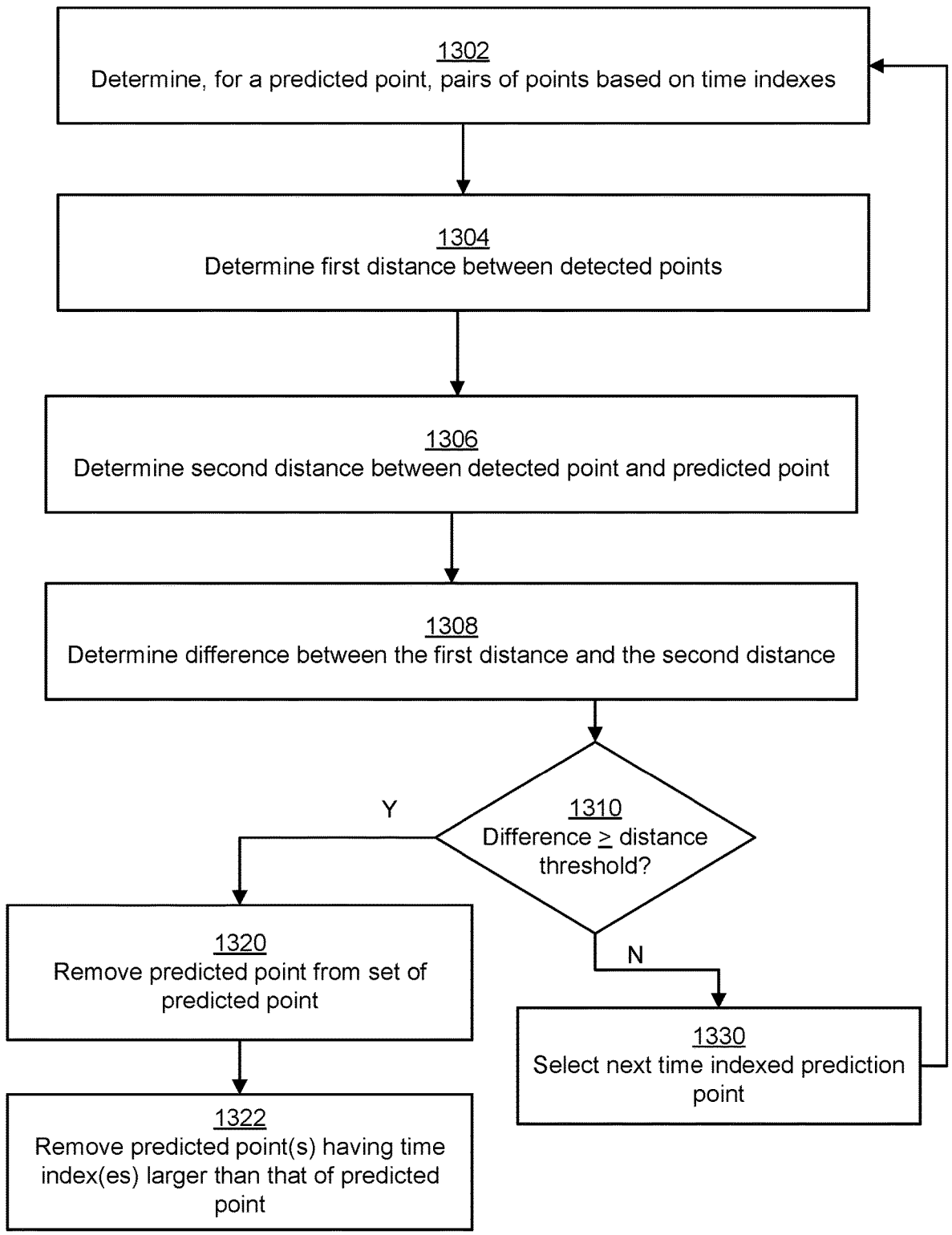
FIG. 13 illustrates an example of a flow for distance-based filtering of predicted contact points, according to embodiments of the present disclosure.

FIG. 13 illustrates an example of a flow for distance-based filtering of predicted contact points, according to embodiments of the present disclosure. Some operation of the flow of FIG. 13 can be implemented as sub-operations of the flow of FIGS. 8 and 10 and/or can be similar to operations of the flows of FIGS. 8 and 10. Similarities are not repeated herein in the interest of brevity and equivalently apply to the flow of FIG. 13. Further, the flow of FIG. 13 can be used in conjunction with the flow of FIG. 12. As illustrated, the flow of FIG. 13 may start at operation 1302, where the computing device determines, for a predicted point of a prediction algorithm, pairs of points based on time indexes. A first pair includes the predicted point and a first detected point having the most recent time index. The predicted point is at a time interval after the first detected point. A second detected point that is before the first detected point by the same amount of time is determined. A second pair includes the first detected point and the second detected point. The two detected points belong to the last time period, whereas the predicted point corresponds to the next time period.

The flow may also include operation 1304, where the computing device determines a first distance between the detected points of the second pair. For example, the first distance is a Euclidean distance determined from the position data of these two points.

The flow may also include operation 1306, where the computing device determines a second distance between the points of the first pair (e.g., between the first detected point and the predicted point). For example, the second distance is a Euclidean distance determined from the position data of these two points.

The flow may also include operation 1308, where the computing device determines a difference between the first distance and the second distance. For example, the difference is equal to the subtraction of the second distance from the first distance.

The flow may also include operation 1310, where the computing device compares the distance difference to a distance threshold. In an example, the prediction error determined for the prediction algorithm and associated with the last time period is used to adjust the distance threshold. This distance threshold can be expressed as the first distance multiplied by a multiplier, where the multiplier is decreased with an increase to the prediction error. If larger or equal to the distance threshold, operation 1320 can follow operation 1310. Otherwise, operation 1330 can be performed.

The flow may also include operation 1320, where the computing device removes the predicted point from the set of predicted points usable to present an output on a screen. This operation can be similar to operation 1210 of FIG. 12.

The flow may also include operation 1322, where the computing device removes one or more predicted points having time index(es) larger than that of the predicted point. This operation can be similar to operation 1212 of FIG. 12.

The flow may also include operation 1330, where the computing device selects the next time indexed prediction point. This operation can be similar to operation 1220 of FIG. 12, and a loop back to operation 1302 can exist.

As explained herein above, various operations related to predicting contact points are described as being implemented on a computing device, such as the computing device 110 of FIG. 1. However, the embodiments of the present disclosure are not limited as such. Instead, some or all of these operations can be performed on another device or a system (e.g., a cloud-based resource) that is communicatively coupled with the device, or can be distributed between the computing device and the other device/system.

Figure 14:
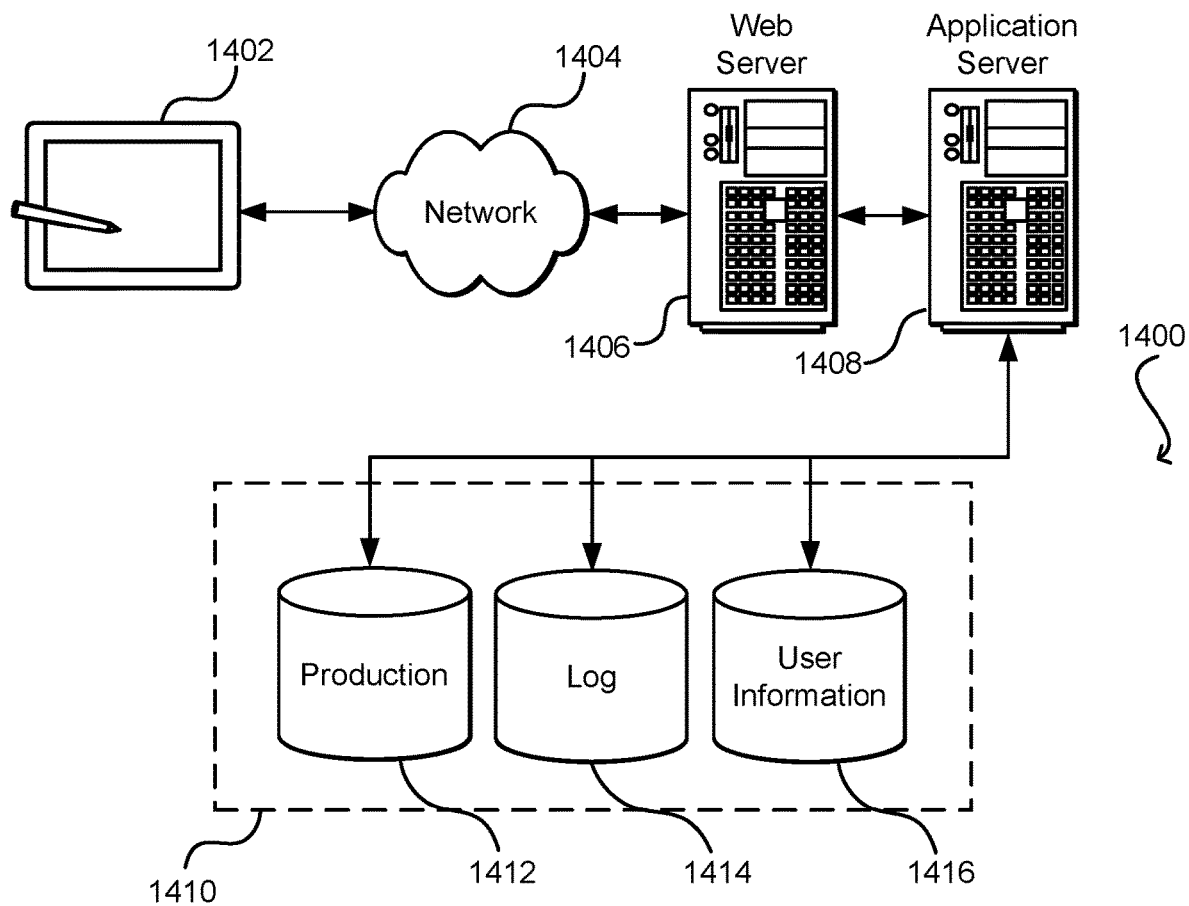
FIG. 14 illustrates an environment in which various embodiments can be implemented.

FIG. 14 illustrates an environment 1400 in which various embodiments can be implemented. As will be appreciated, although a Web-based environment is used for purposes of explanation, different environments may be used, as appropriate, to implement various embodiments. The environment includes an electronic client device 1402, which can be an example of the computing device 110 of FIG. 1 and can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   determining, at a first time, a first point associated with a first contact between a stylus and a screen, the first contact predicted to occur at a second time after the first time;
   detecting, at the second time, a second point associated with a second contact between the stylus and the screen;
   predicting, based at least in part on the second point, a set of points associated with subsequent contacts between the stylus and the screen;
   determining a first prediction error based at least in part on the first point and the second point;
   selecting, after the first prediction error is determined, a third point from the set of points based at last in part on the first prediction error, the third point being associated with a third contact between the stylus and the screen predicted to occur at a third time after the second time; and
   displaying, prior to the third time, an output on the screen at the third point.

2. The method of claim 1 further comprising:
   determining, at the first time, a fourth point associated with a fourth contact between the stylus and the screen, the fourth contact predicted to occur at the second time, wherein the first point is determined using a first algorithm executing on a computing device, and the fourth point is determined using a second algorithm executing on the computing device;
   determining a second prediction error based at least in part on the fourth point and the second point, wherein the first prediction error corresponds to the first algorithm, and the second prediction error corresponds to the second algorithm;
   determining that the first prediction error is smaller than the second prediction error; and selecting the set of points, wherein the set of points are determined by the first algorithm.

3. The method of claim 1 further comprising:
determining a threshold value based at least in part on the first prediction error;
detecting, at a fourth time prior to the first time, a fourth point associated with a fourth contact between the stylus and the screen;
determining a fifth point from the set of points, the fifth point being associated with a fifth contact between the stylus and the screen predicted to occur at a fifth time after the third time;
determining an angle formed by the fourth point, the second point, and the fifth point;
determining that the angle is smaller than an angle threshold;
removing the fifth point from the set of points based at least in part on the angle being smaller than the angle threshold; and
displaying, prior to the third time, a line on the screen connecting remaining points from the set of points, the remaining points comprising the third point.

4. A computer-implemented method comprising:
determining, at a first time, a first point associated with a first interaction between a stylus and a screen, the first interaction predicted to occur at a second time after the first time;
detecting, at the second time, a second point associated with a second interaction between the stylus and the screen;
predicting, based at least in part on the second point, a set of points associated with subsequent interactions between the stylus and the screen;
determining a first prediction error based at least in part on the first point and the second point;
selecting, after the first prediction error is determined, a third point from the set of points based at last in part on the first prediction error, the third point being associated with a third interaction between the stylus and the screen predicted to occur at a third time after the second time; and
displaying, prior to the third time, an output on the screen at the third point.

5. The computer-implemented method of claim 4, the set of points is a first set of points, and wherein the computer-implemented method further comprises:
determining, at the first time, a fourth point associated with a fourth interaction between the stylus and the screen, the fourth interaction predicted to occur at the second time, wherein the first point is predicted by a first prediction algorithm, and wherein the fourth point is predicted by a second prediction algorithm;
predicting a second set of points based at least in part on the second point, wherein the first set of points is predicted by the first prediction algorithm, and wherein the second set of points is predicted by the second prediction algorithm;
determining a second prediction error based at least in part on the fourth point and the second point; and
selecting, based at least in part on a comparison of the first prediction error with the second prediction error, the first set of points rather than the second set of points to be used for the displaying prior to the third time.

6. The computer-implemented method of claim 4, further comprising:
comparing the first prediction error with a prediction error threshold or a previously computed prediction error;
determining a threshold value based at least in part on the comparing; and
removing a fourth point from the set of points based at least in part on the threshold value, wherein the fourth point is associated with a fourth interaction between the stylus and the screen predicted to occur at a fourth time after the third time.

7. The computer-implemented method of claim 4, further comprising:
determining that the first prediction error is larger than a prediction error threshold or a previously computed prediction error;
increasing, from a first value to a second value, an angle threshold to be compared to an angle associated with the third point; and
determining that the angle is larger than the second value, wherein the third point is selected based at least in part on the angle being larger than the second value.

8. The computer-implemented method of claim 4, further comprising:
determining a value of an angle threshold based at least in part on the first prediction error, the angle threshold to be compared to angles associated with the set of points;
detecting, at a fourth time prior to the first time, a fourth point associated with a fourth interaction between the stylus the screen;
determining a first angle formed by fourth point, the second point, and the third point; and
determining that the first angle is larger than the value, wherein the third point is selected based at least in part on the first angle being larger than the value.

9. The computer-implemented method of claim 8, further comprising:
determining a second angle formed by a fifth point from the set of points, wherein the fifth point is associated with a fifth interaction between the stylus and the screen predicted to occur at a fifth time after the third time;
determining that the second angle is smaller than the value;
removing the fifth point from the set of points based at least in part on the second angle being smaller than the value;
determining a sixth point from the set of points, wherein the sixth point is associated with a sixth interaction between the stylus and the screen predicted to occur at a sixth time after the fifth time; and
removing the sixth point from the set of points based at least in part on the sixth interaction being predicted to occur at the sixth time subsequent to the fifth time.

10. The computer-implemented method of claim 4, further comprising:
determining a value of a distance threshold based at least in part on the first prediction error; and
determining a first distance between the second point and the third point, wherein the third point is selected based at least in part on the first distance and the value of the distance threshold.

11. The computer-implemented method of claim 10, further comprising:
detecting, at a fourth time prior to the first time, a fourth point associated with a fourth interaction between the stylus and the screen;
determining a second distance between the fourth point and the second point; and
comparing a distance measure with the value of the distance threshold, wherein the distance measure comprises a difference between the first distance and the second distance or a ratio of the first distance and the second distance, wherein the third point is selected based at least in part on the comparing.

12. A device comprising:
one or more processors; and
one or more memories storing instructions that, upon execution by the one or more processors, configure the device to:
  determine, at a first time, a first point associated with a first interaction between a stylus and a screen, the first interaction predicted to occur at a second time after the first time;
  detect, at the second time, a second point associated with a second interaction between the stylus and the screen;
  predict, based at least in part on the second point, a set of points associated with subsequent interactions between the stylus and the screen;
  determine a first prediction error based at least in part on the first point and the second point;
  select, after the first prediction error is determined, a third point from the set of points based at last in part on the first prediction error, the third point being associated with a third interaction between the stylus and the screen predicted to occur at a third time after the second time; and
  display, prior to the third time, an output on the screen at the third point.

13. The device of claim 12, wherein the one or more memories store additional instructions that, upon execution by the one or more processors, further configure the device to:
  determine a threshold value based at least in part on the first prediction error;
  determine a fourth point from the set of points, the fourth point being associated with a fourth interaction between the stylus and the screen predicted to occur at a fourth time after the third time; and
  remove the fourth point from the set of points based at least in part on the threshold value.

14. The device of claim 12, wherein the one or more memories store additional instructions that, upon execution by the one or more processors, further configure the device to:
  determine a distance between the third point and the second point;
  detect, at a fourth time prior to the first time, a fourth point associated with a fourth interaction between the stylus and the screen; and
  determine an angle formed by the second point, the fourth point, and the third point, wherein the first predicted error is computed based at least in part on the distance and the angle.

15. The device of claim 12, wherein the one or more memories store additional instructions that, upon execution by the one or more processors, further configure the device to:
  determine first data associated with the second interaction, wherein the first data indicates at least one of: a first detected pressure of the stylus on the screen at the second point or a first detected tilt of the stylus relative to the screen at the second point; and
  determine second data associated with the first point, wherein the second data indicates at least one of: a predicted pressure of the stylus on the screen at the first point or a predicted tilt of the stylus relative to the screen at the first point, wherein the first predicted error is computed based at least in part on the first data and the second data.

16. The device of claim 12, wherein the first point and the set of points are predicted by a first prediction algorithm, and wherein the one or more memories store additional instructions that, upon execution by the one or more processors, further configure the device to:
  compute a plurality of prediction errors based at least in part on an output of the first prediction algorithm, wherein the output comprises time-series data of predicted points, wherein each one of the plurality of prediction errors corresponds to a predicted point of the time-series data; and
  determine the first prediction error based at least in part on the plurality of prediction errors.

17. The device of claim 12, wherein the set of points is a first set of points, and wherein the one or more memories store additional instructions that, upon execution by the one or more processors, further configure the device to:
  predict a second set of points based at least in part on the second point, wherein the first set of points is predicted by a first prediction algorithm, and wherein the second set of points is predicted by a second prediction algorithm, wherein the first prediction error corresponds to the first prediction algorithm; and
  select, based at least in part on a comparison of the first prediction error with a second prediction error that corresponds to the second prediction algorithm, the first set of points instead of the second set of points.

18. The device of claim 12, wherein the third point is predicted by a first prediction algorithm, and wherein the one or more memories store additional instructions that, upon execution by the one or more processors, further configure the device to:
  determine, based at least in part on using the second point as input to a second prediction algorithm, a fourth point associated with a fourth interaction between the stylus and the screen predicted to occur at the third time;
  detect, at the third time, a fifth point associated with a fifth interaction between the stylus and the screen;
  determine, based at least in part on using the fifth point as input to the first prediction algorithm, a sixth point associated with a sixth interaction between the stylus and the screen predicted to occur at a fourth time after the third time;
  determine, based at least in part on using the fifth point as input to the second prediction algorithm, a seventh point associated with a seventh interaction between the stylus and the screen predicted to occur at the fourth time;
  compute a second prediction error based at least in part on the third point and the fifth point;
  compute a third prediction error based at least in part on the fourth point and the fifth point; and
  select, based at least in part on the second prediction error and the third prediction error, the sixth point instead of the seventh point.

19. The device of claim 12, wherein the one or more memories store additional instructions that, upon execution by the one or more processors, further configure the device to:
  forgo a selection of a fourth point from the set of points based at least in part on the first prediction error.

20. The device of claim 12, wherein the one or more memories store additional instructions that, upon execution by the one or more processors, further configure the device to:

forgo a selection of a fourth point from the set of points based at least in part on a second prediction error, wherein the set of points is predicted by at least using a first prediction algorithm that predicts the third point and a second prediction algorithm that predicts the fourth point, wherein the first prediction error is associated with the first prediction algorithm, and wherein the second prediction error is associated with the second prediction algorithm.

\* \* \* \* \*